US008121027B2

(12) United States Patent
Watanabe et al.

(10) Patent No.: US 8,121,027 B2
(45) Date of Patent: Feb. 21, 2012

(54) ACCESS GATEWAY, TERMINAL AND METHOD OF CONTROLLING FLOW IN WIRELESS SYSTEM

(75) Inventors: Koji Watanabe, Kokubunji (JP); Yosuke Takahashi, Yokohama (JP); Norihisa Matsumoto, Fuchu (JP)

(73) Assignee: Hitachi, Ltd., Tokyo (JP)

( * ) Notice: Subject to any disclaimer, the term of this patent is extended or adjusted under 35 U.S.C. 154(b) by 97 days.

(21) Appl. No.: 12/097,183

(22) PCT Filed: Dec. 27, 2005

(86) PCT No.: PCT/JP2005/023872
§ 371 (c)(1),
(2), (4) Date: Jun. 12, 2008

(87) PCT Pub. No.: WO2007/074511
PCT Pub. Date: Jul. 5, 2007

(65) Prior Publication Data
US 2009/0129275 A1   May 21, 2009

(51) Int. Cl.
*H04W 4/00* (2009.01)
(52) U.S. Cl. .................. 370/229; 370/338; 370/401
(58) Field of Classification Search .......... None
See application file for complete search history.

(56) References Cited

U.S. PATENT DOCUMENTS

| | | | | |
|---|---|---|---|---|
| 5,826,188 A * | 10/1998 | Tayloe et al. | ................. | 455/428 |
| 6,567,396 B1 * | 5/2003 | Pohjanvouri et al. | ......... | 370/349 |
| 6,865,220 B2 * | 3/2005 | Abrishami | .................... | 375/220 |
| 7,009,950 B1 * | 3/2006 | Hirata et al. | .................. | 370/331 |
| 2003/0135626 A1 | 7/2003 | Ray et al. | | |
| 2003/0214928 A1 * | 11/2003 | Chuah | ........................... | 370/336 |
| 2004/0131072 A1 * | 7/2004 | Khan et al. | ..................... | 370/419 |
| 2004/0192221 A1 * | 9/2004 | Matsunaga | ..................... | 455/76 |
| 2004/0257995 A1 * | 12/2004 | Sandy et al. | ................... | 370/235 |
| 2005/0122900 A1 * | 6/2005 | Tuulos et al. | ................. | 370/229 |
| 2005/0122975 A1 * | 6/2005 | Lim | .............................. | 370/389 |
| 2005/0188113 A1 | 8/2005 | Lee et al. | | |
| 2006/0056448 A1 * | 3/2006 | Zaki et al. | ..................... | 370/466 |
| 2006/0270411 A1 * | 11/2006 | Grayson | ....................... | 455/444 |

FOREIGN PATENT DOCUMENTS

| | | |
|---|---|---|
| JP | 8-46643 | 2/1996 |
| JP | 2003-333639 | 11/2003 |
| JP | 2005-244524 | 9/2005 |
| JP | 2005-244525 | 11/2005 |
| JP | 2005-311702 | 11/2005 |
| JP | 2005-341610 | 12/2005 |
| WO | WO 2005/115026 | 12/2005 |

OTHER PUBLICATIONS

3GPP2 X.P0011-D, Chapter 3, (Jun. 2005).
3GPP2 X.P001-D, Chapter 4, (Jun. 2005).
3GPP2X.P0028-200v0.1, x31-20050926-005 (Sep. 2005).
European Search Report in European Patent Application No. 05822541.8 dated Aug. 13, 2010.

* cited by examiner

*Primary Examiner* — Kevin C Harper
(74) *Attorney, Agent, or Firm* — Brundidge & Stanger, P.C.

(57) ABSTRACT

A wireless system includes plural different access networks and terminals (19, 20) having interfaces corresponding to the plural different access networks (3, 5, 9, 13). Each of the access networks includes an access gateway (AGW) performing flow control. Upon receiving a packet transmission stop signal, the AGW determines whether a predetermined message transmitting chance is given. The AGW includes a control unit that transmits a message that requests a handover to another access network to a terminal when the message transmitting chance is given. The terminal includes a unit that performs a handover to another access network, upon receiving the message.

15 Claims, 21 Drawing Sheets

RRQ

| CONTROL | ~ 221 |
|---|---|
| HoA | ~ 222 |
| HA | ~ 223 |
| CoA | ~ 224 |
| ID | ~ 225 |

RRP

| CONTROL | ~ 231 |
|---|---|
| HoA | ~ 232 |
| HA | ~ 233 |
| CoA | ~ 234 |
| ID | ~ 235 |

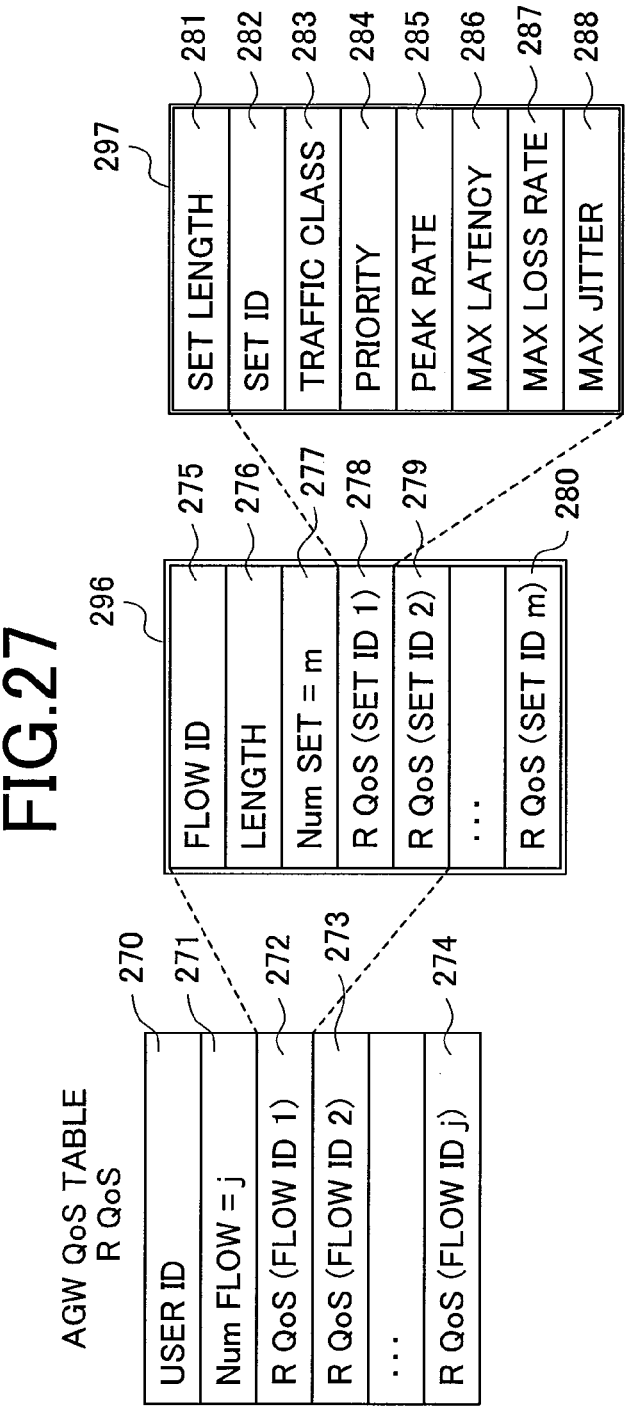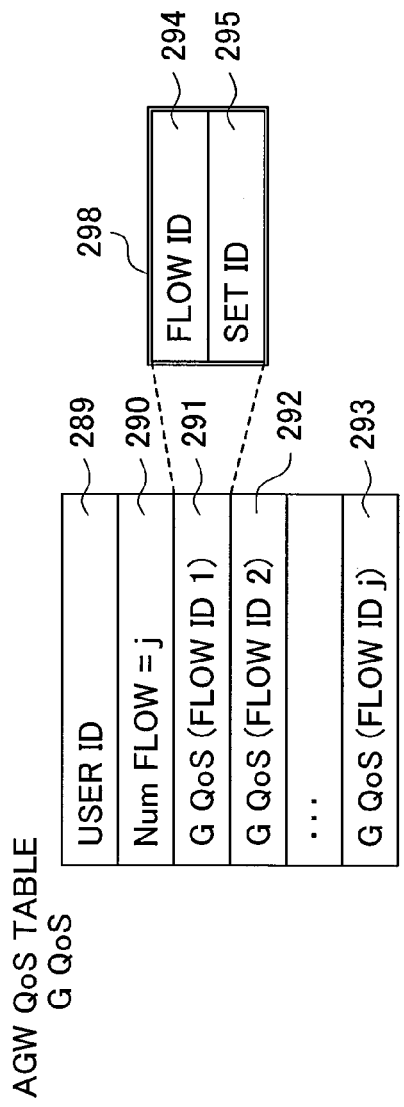

FIG.29

AGW ADR TABLE
AGW4 (PDSN):

| | HAT ID | Sys ID | HoA | HA | CoA |
|---|---|---|---|---|---|
| 310 | HAT19 | WLAN | HoA_1 | HA_1 | CoA_1 |
| 311 | HAT19 | WIRE-LINE | HoA_2 | HA_2 | CoA_2 |
| 312 | HAT20 | WLAN | HoA_3 | HA_3 | CoA_3 |
| 313 | HAT20 | WiMAX | HoA_4 | HA_4 | CoA_4 |

FIG.30

AGW ADR TABLE
AGW8 (PDIF):

| | HAT ID | Sys ID | HoA | HA | CoA |
|---|---|---|---|---|---|
| 314 | HAT19 | 1xEv-DO | HoA_5 | HA_5 | CoA_5 |
| 315 | HAT19 | WIRE-LINE | HoA_2 | HA_2 | CoA_2 |
| 316 | HAT20 | 1xEv-DO | HoA_6 | HA_6 | CoA_6 |
| 317 | HAT20 | WiMAX | HoA_4 | HA_4 | CoA_4 |

FIG.31

AGW ADR TABLE
AGW2:

| | HAT ID | Sys ID | HoA | HA | CoA |
|---|---|---|---|---|---|
| 318 | HAT19 | WLAN | HoA_1 | HA_1 | CoA_1 |
| 319 | HAT19 | 1xEv-DO | HoA_5 | HA_5 | CoA_5 |

FIG.32

AGW ADR TABLE
AGW12:

| | HAT ID | Sys ID | HoA | HA | CoA |
|---|---|---|---|---|---|
| 320 | HAT20 | 1xEv-DO | HoA_6 | HA_6 | CoA_6 |
| 321 | HAT20 | WLAN | HoA_3 | HA_3 | CoA_3 |

FIG.33

HA TABLE

| | CONTROL 331 | HoA 332 | HA 333 | CoA 334 | ID 335 |
|---|---|---|---|---|---|
| 341 | CONTROL1 | HoA_1 | HA_1 | CoA_1 | ID_1 |
| 342 | CONTROL2 | HoA_2 | HA_2 | CoA_2 | ID_2 |
| 343 | CONTROL3 | HoA_3 | HA_3 | CoA_3 | ID_3 |
| 344 | CONTROL4 | HoA_4 | HA_4 | CoA_4 | ID_4 |
| 345 | CONTROL5 | HoA_5 | HA_5 | CoA_5 | ID_5 |
| 346 | CONTROL6 | HoA_6 | HA_6 | CoA_6 | ID_6 |

ALGORITHM FOR DETERMINING HOR TRANSMITTING CHANCE AT AGW

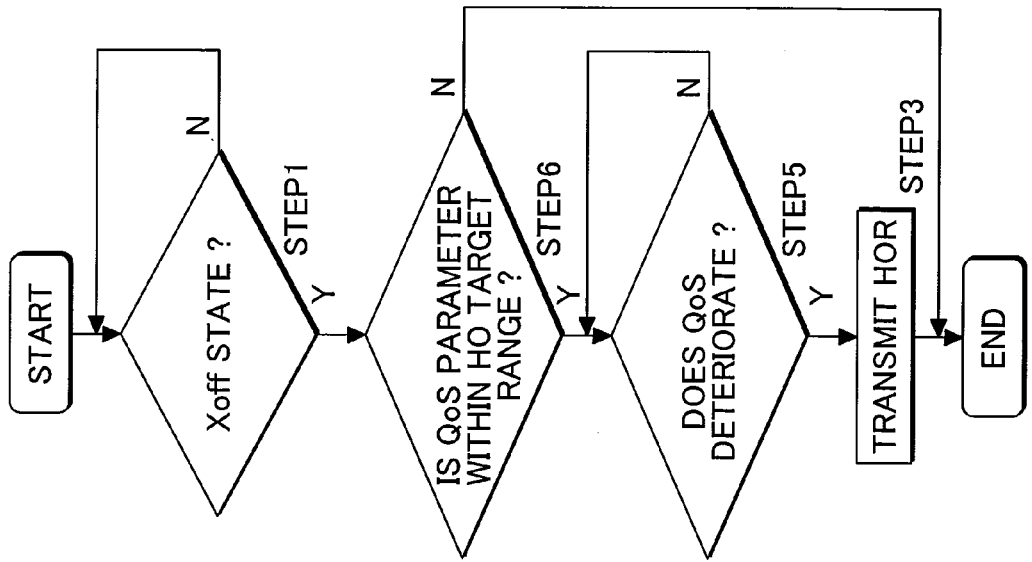
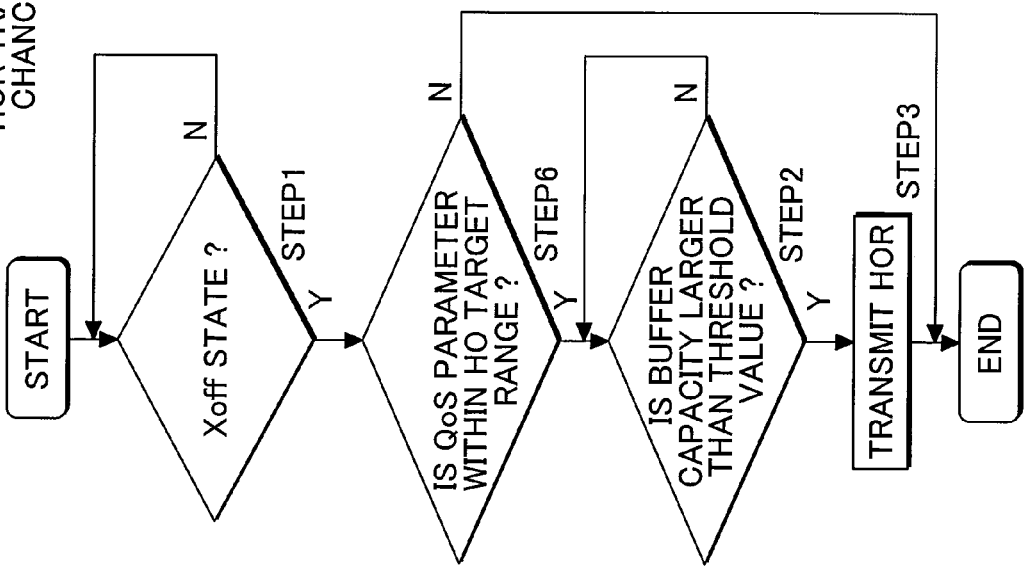

US 8,121,027 B2

ACCESS GATEWAY, TERMINAL AND METHOD OF CONTROLLING FLOW IN WIRELESS SYSTEM

CLAIM OF PRIORITY

The present application claims priority from PCT patent application PCT/JP2005/023872 filed on Dec. 27, 2005, the content of which is hereby incorporated by reference into this application.

FIELD OF THE INVENTION

The present invention relates to an access system performing flow control, a wireless system performing a handover between access systems, and a flow control method.

BACKGROUND OF THE INVENTION

A method of controlling flow between a PDSN (Packet Data Service Node), which is an access gateway, and a 1xEv-DO (1x Evolution Data Only) RAN (Radio Access Network) has been proposed in Chapter 8 of the NON-PATENT DOCUMENT 1 as a type of wireless system that has been standardized by 3GPP2 ($3^{rd}$ Generation Partnership Project 2).

Further, a method of setting QoS (Quality of Service) in a wireless system has been proposed in the NON-PATENT DOCUMENT 2, which has been standardized by 3GPP2 ($3^{rd}$ Generation Partnership Project 2). In the document, Annex.E discloses the format of a QoS parameter used for signaling, and Annex.F discloses a call flow in which a mobile station (MS) requests QoS from a network and a RAN permits the request.

Furthermore, a standard for inter-working between a wireless LAN and a 1xEv-DO system has been proposed in the NON-PATENT DOCUMENT 3, which has been standardized by 3GPP2 ($3^{rd}$ Generation Partnership Project 2).

[NON-PATENT DOCUMENT 1]: X.P0011-D, Chapter 3 (July, 2005)

[NON-PATENT DOCUMENT 2]: X.P0011-D, Chapter 4 (July, 2005)

[NON-PATENT DOCUMENT 3]: X.P0028-200 v0.1, X31-20050926-005 (September, 2005)

DISCLOSURE OF THE INVENTION

Problem to be Solved by the Invention

FIG. 1 shows an example of a wireless system, which is the premise of the present invention. A Core Network 1 is an IP (Internet protocol) core network. A Wire-Line Access Network 3 is a wire access network, a 1xEv-DO RAN 5 is a 1xEv-DO radio access network, a WLAN RAN 9 is a Wireless LAN (WLAN) radio access network, and a WiMAX RAN 13 is a WiMAX (Worldwide Interoperability for Microwave Access) radio access network.

An Access Gate Way (AGW) 8 is a gateway provided at the boundary between the access network and the core network. An AGW 2 is an Access Gateway provided between the wire-line access network 3 and the core network 1. An AGW 4 is an Access Gate Way provided between the 1xEv-DO RAN 5 and the core network 1, which is called a PDSN. The AGW 8 is an access gateway provided between the WLAN RAN 9 and the core network 1, which is called a PDIF (Packet Data Inter-working Function). An AGW 12 is an Access Gate Way provided between the WiMAX RAN 13 and the core network 1. An AP 7 is an access point (AP) of the 1xEv-DO system. An AP 11 is an access point of the wireless LAN. An AP 15 is an Access Point of the WiMAX system. An H/R 18 is a HUB or a router including an HAT 19 in the wire-line access network 3. A PCF (Packet Control Function) 6 is a packet control function device that transmits packets between the AP 7 and the AGW 4. An H/R 10 is a hub or a router including the AP 11 in the WLAN RAN 9. An H/R 14 is a hub or a router including the AP 15 in the WiMAX RAN 13.

HATs 19 and 20 are Hybrid Access Terminals, and include interfaces for connection to plural different access systems. A CN 16 is a Correspondence Node that communicates with the HATs 19 and 20. An HA 17 is a Home Agent of a Mobile IP.

In the prior art, flow control is performed in the access network in order to prevent packet discard. FIG. 40 shows an example of the flow control disclosed in NON-PATENT DOCUMENT etc. The flow control is performed between a network 22 and an AGW 21. The network 22 is any one of the wire-line access network 3, the 1xEv-DO RAN 5, the WLAN RAN 9, and the WiMAX RAN 13, and the AGW 21 is any one of the AGWs 2, 4, 8, and 12. For example, when packet transmission to the HAT 19 is interrupted due to traffic congestion and the amount of packet information stored in an apparatus of the network 22 is larger than a predetermined value, the network 22 transmits a packet transmission stop signal 23 to the AGW 21. The AGW 21 stops to transmit packets to the network 22, and stores or discards an IP packet 25 input from the core network 1.

When the transmission rate of the packet to the HAT 19 is restored and the amount of packet information staying in the apparatus of the network 22 is smaller than a predetermined value, the network 22 transmits a packet transmission start signal 24 to the AGW 21. The AGW 21 resumes the transmission of packets to the network 22 (in this specification, the packet transmission stop signal is represented by Xoff and the packet transmission start signal is represented by Xon).

In the prior art, the AGW 21 discards the packet. In the case of the AGW 21 that stores the IP packet 25, when the AGW 21 receives Xoff but does not receive Xon because the transmission rate is not restored, the buffer overflows, which results in the discard of the packet.

However, it is impractical to perform flow control on all the paths from the HAT to the CN through a backbone network or the Internet with whom the operation and management are not integrated.

An object of the present invention is to reduce the amount of packets discarded by the AGW by significantly reducing the amount of impact to the core network.

It is possible to consider a flow control signal received by each AGW as an index for a load applied to the access network.

Another object of the present invention is to provide a method of performing a handover between new access systems according to a load applied to the access networks.

Means for Solving the Problem

Some aspects of the present invention will be described briefly as follows.

According to an aspect of the present invention, an access gateway for controlling the flow of an access network comprises a receiving unit for receiving a packet transmission stop signal from the access network, and a control unit; wherein, upon receiving a packet transmission stop signal, the control unit determines whether a predetermined message transmitting chance is given, and when it is determined that the message transmitting chance is given, transmits a message that requests a handover to a second access network whose type is different from that of a first access network including the access gateway to a terminal belonging to the access network.

According to another aspect of the present invention, a wireless system includes plural different access networks and a terminal having interfaces corresponding to the plural different access networks. Each of the access networks includes an AGW that performs flow control. When receiving a packet transmission stop signal, the AGW determines whether a predetermine message transmitting chance is given. The AGW includes a control unit that transmits a message for requiring a handover to another access network to the terminal when the message transmitting chance is given. In addition, the terminal includes a unit that performs a handover to another access network when receiving the message.

Further, preferably, the AGW according to the present invention includes a unit that transmits the handover request message to the terminal through an access network including the AGW and an interface of the terminal corresponding to the access network including the AGW. In this case, the AGW and the access network including the AGW transmit the message having higher priority than user data.

Furthermore, preferably, the AGW according to the present invention includes a unit that transmits the handover request message to the terminal through an access network not including the AGW and an interface of the terminal corresponding to the access network. The AGW include a storage unit that stores address information and a control unit that manages the address information, selects a destination from the address information, and transmits the message.

According to another aspect of the present invention, a terminal includes a unit that transmits a message including address information of an interface of the terminal, which corresponds to another access network different from one access network, to an AGW belonging to the one access network connected to the terminal.

Preferably, the AGW according to the present invention includes a storage unit that stores transmission information for the terminal. When the amount of transmission information stored in the storage unit is larger than a threshold value, the AGW determines a chance to transmit the handover request message.

Further, preferably, the AGW according to the present invention includes a storage unit that stores a communication quality (QoS) to be provided to the terminal, and a control unit that measures the communication quality and compares the measured communication quality with the communication quality stored in the storage unit. When the measured communication quality is lower than that stored in the storage unit, the AGW determines that a message transmitting chance is given. Preferably, the control unit measures and compares at least one of a packet loss rate and latency as the communication quality.

Preferably, the AGW according to the present invention randomly determines the predetermined message transmitting chance. Preferably, the AGW includes a storage unit that stores a communication quality provided to the terminal. When the communication quality is within a predetermined range, the AGW determines that the predetermined message transmitting chance is given. Preferably, the communication quality is any one of a traffic class, priority, latency, and a packet loss rate.

Effect of the Invention

According to the wireless system according to the present invention, the access network includes the AGW that performs flow control. When receiving the packet transmission stop signal, the AGW determines whether a predetermined message transmitting chance is given. In addition, the terminal includes a unit that performs a handover to another access network when receiving the message. Therefore, when each access system can absorb a traffic load, it is possible to prevent unnecessary switching to use the access system. As a result, it is possible to stably use one access system and thus reduce signaling overhead that accompanies the switching operation, the number of communication interruptions, or time.

Further, the AGW according to the present invention includes a unit that stores transmission information for the terminal, and determines that the transmitting chance of a handover request message is given when the amount of transmission information stored in the storage unit is larger than a threshold value. When each access system cannot absorb a traffic load, switching from the access system that is currently being used to another access system is performed. Therefore, it is possible to reduce the possibility of the AGW of each of the access systems discarding the packets.

Furthermore, the AGW according to the present invention includes a storage unit that stores a communication quality provided to the terminal and a control unit that measures the communication quality and compares the measured communication quality with that stored in the storage unit. When the measured communication quality is lower than that stored in the storage unit, the AGW determines that the message transmitting chance is given. When each access system cannot absorb a traffic load and the communication quality deteriorates, switching from the access system that is currently being used to another access system is performed. Therefore, it is possible to reduce the deterioration in communication quality.

Moreover, the AGW according to the present invention includes a storage unit that stores a communication quality provided to the terminal, and determines that the message transmitting chance is given when the communication quality is within a predetermined range. The AGW can perform a handover between different types of access systems only when it is necessary to maintain the communication quality provided to the terminal.

Further, the AGW according to the present invention randomly determines the predetermined message transmitting chance. When the AGW collectively performs a handover on all the IP flows receiving the packet transmission stop signal, there is a concern that a load is concentrated on a handover destination. However, since the AGW randomly performs a handover, it is possible to distribute a load.

The AGW according to the present invention transmits the handover request message to the terminal through an access network including the AGW and an interface of the terminal corresponding to the access network including the AGW. In this case, the AGW and the access network including the AGW transmit the message having higher priority than user data. Therefore, if communication is not completely interrupted, the AGW can transmit the handover request message to the terminal even though the transmission of the user data is stopped.

The AGW according to the present invention includes a unit that transmits the handover request message to the terminal through an access network not including the AGW and an interface of the terminal corresponding to the access network. Even though the communication of the access system used is completely interrupted, the message can be transmitted through another access system. Therefore, the AGW can transmit the handover request message to the terminal.

The terminal according to the present invention includes a unit that transmits a message including address information of an interface of the terminal, which corresponds to another access network different from one access network, to an AGW belonging to the one access network connected to the terminal. Therefore, the AGW can obtain the address of a message destination.

DESCRIPTION OF THE PREFERRED EMBODIMENTS

Hereinafter, various terminals, an access network, and an access gateway according to embodiments of the present invention, which are applicable to the wireless system shown in FIG. 1, will be described with reference to the accompanying drawings.

[Example of HAT]

First, an example of the structure of an HAT according to a first embodiment of the present invention is shown in FIG. 2. As described above, an HAT 19 (and HAT 20) is a hybrid access terminal that includes an interface for connection to plural different access systems. In FIG. 2, a 1xEv-DO interface (1xEv-DO IF) 34 is an interface for connection to a 1xEv-DO RAN 5. A BB (Baseband Unit) 38 processes the baseband signals transmitted or received to or from the 1xEv-DO system. For example, the BB 38 modulates a transmission signal, supplements the synchronization of received signals, and demodulates the received signals. An IF (interface) 37 processes an intermediate frequency (IF) signal of the 1xEv-DO system. The IF 37 performs DA (Digital-to-Analog) conversion on the baseband signal of 1xEv-DO input from the BB 38, and converts the converted signal into an intermediate frequency signal, and outputs the signal to an RF (Radio Frequency) unit 36. In addition, the IF 37 performs AD (Analog-to-Digital) conversion on an RF signal of 1xEv-DO input from the RF unit 36, and outputs the converted signal to the BB 38. The RF unit 36 processes the radio frequency (RF) signal of 1xEv-DO. The RF unit 36 up-converts the signal input from the IF 37 into an RF signal, amplifies transmission power, and outputs the RF signals to an antenna 35. In addition, the RF unit 36 down-converts the RF signal received from the antenna 35 into an intermediate frequency signal, and outputs the signal to the IF 37.

A WLAN interface (WLAN IF) 39 is an interface for connection to a WLAN RAN 9. A BB 43 processes the baseband signals transmitted or received to or from a wireless LAN. For example, the BB 43 modulates a transmission signal, supplements the synchronization of received signals, and demodulates the received signals. An IF 42 processes an intermediate frequency (IF) signal of the wireless LAN. The IF 42 performs DA (Digital-to-Analog) conversion on the baseband signal of the wireless LAN input from the BB 43, and converts the converted signal into an intermediate frequency signal, and outputs the signal to an RF unit 41. In addition, the IF 42 performs AD (Analog-to-Digital) conversion on an RF signal of the wireless LAN input from the RF unit 41, and outputs the converted signal to the BB 43. The RF (Radio Frequency) unit 41 processes the radio frequency (RF) signal of the wireless LAN. The RF unit 41 up-converts the signal input from the IF 42 into an RF signal, amplifies transmission power, and outputs the RF signal to an antenna 40. In addition, the RF unit 41 down-converts the RF signal received from the antenna 40 into an intermediate frequency signal, and outputs the signal to the IF 42.

A WiMAX interface (WiMAX IF) 44 is an interface for connection to a WiMAX RAN 13. A BB 48 processes the baseband signals transmitted or received to or from a WiMAX system. For example, the BB 48 modulates a transmission signal, supplements the synchronization of received signals, and demodulates the received signals. An IF 47 processes an intermediate frequency (IF) signal of the WiMAX system. The IF 47 performs DA (Digital-to-Analog) conversion on the baseband signal of the WiMAX system input from the BB 48, and converts the converted signal into an intermediate frequency signal, and outputs the signal to an RF unit 47. In addition, the IF 47 performs AD (Analog-to-Digital) conversion on an RF signal of the WiMAX system input from the RF unit 46, and outputs the converted signal to the BB 48. The RF (Radio Frequency) unit 46 processes the radio frequency (RF) signal of the WiMAX system. The RF unit 46 up-converts the signal input from the IF 47 into an RF signal, amplifies transmission power, and outputs the RF signal to an antenna 45. In addition, the RF unit 46 down-converts the RF signal received from the antenna 45 into an intermediate frequency signal, and outputs the signal to the IF 47.

A wire-line interface (wire-line IF) 49 is an interface for connection to a wire-line network 3.

A control unit 31 manages the overall operation of the access point (AP). The control unit 31 performs various control processes, such as a process of composing, decomposing, discarding packets that are received or to be transmitted, a process of controlling the transmission timing of packets, a process of managing information in a storage unit 32, a process of transmitting messages, a process of analyzing received messages, and handover corresponding to the received message, and also executes application software for a conference call. The storage unit 32 stores management information including data that is received or to be transmitted, QoS information, and address information of each interface. A UIF 33 is a user interface, such as a keyboard, a display, or a speaker.

[Example of AP]

FIG. 3 shows an example of the structure of an AP (an AP 7, an AP 11, or an AP 15) according to this embodiment of the invention. In FIG. 3, a network interface (NW IF) 55 is for connection to a PCF 6, an H/R 10, or an H/R 14. A BB 54 processes received baseband signals or baseband signals to be transmitted. For example, the BB 54 modulates a transmission signal, supplements the synchronization of received signals, and demodulates the received signals. An IF 53 processes an Intermediate Frequency (IF) signal. The IF 53 performs DA (Digital-to-Analog) conversion on the baseband signal input from the BB 54, and converts the converted signal into an intermediate frequency signal, and outputs the signal to an RF unit 52. In addition, the IF 53 performs AD (Analog-to-Digital) conversion on the signal input from the RF unit 52, and outputs the converted signal to the BB 54. The RF (radio frequency) unit 52 processes radio frequency (RF) signals. The RF unit 52 up-converts the signal input from the IF 53 into an RF signal, amplifies transmission power, and outputs the RF signal to an antenna 51. In addition, the RF unit 52 down-converts the RF signal received from the antenna 51 into an intermediate frequency signal, and outputs the signal to the IF 53. A control unit 57 manages the overall operation of the AP. In addition, the control unit 57 performs a process of composing messages and a process of transmitting the messages. That is, the control unit 57 performs a process of composing, decomposing, or discarding wireless transmission units and packets that are transmitted or received through the NW IF 55, a process of controlling the transmission timing of the wireless transmission unit using a timer 56, a process of managing information in a storage unit 58, and a flow control process. The storage unit 58 stores management information, such as received data, data to be transmitted, and QoS information. The timer 56 is a time counter.

[Example of H/R]

FIG. 4 shows an example of the structure of an H/R (an H/R 10, an H/R 14, or an H/R 18) according to this embodiment of the invention. In FIG. 4, an NW IF 61 is a network interface for connection to an AGW, and an NW IF 62 is a network interface for connection to an AP or an HAT. An SW 64 is a switch for exchanging packets on the basis of the address information in the headers of the packets. A control unit 65 performs a process of managing information stored in a storage unit 63, a process of composing, decomposing, or transmitting/receiving packets, and a flow control process. The storage unit 37 stores packet data that is received or to be transmitted and management information required for flow control.

[Example of PCF]

FIG. 5 shows an example of the structure of a PCF 6 according to this embodiment of the invention. In FIG. 5, an NW IF 71 is a network interface for connection to an AP, and an NW IF 76 is a network interface for connection to an AGW. The SWs 72 and 75 are switches for exchanging packets. A control unit 73 manages the overall operation of the PCF 6. A Traffic Controller (TC) 74 is for composing, decomposing, or transmitting/receiving the packets transmitted by the PCF 6.

FIG. 6 shows an example of the structure of the TC 74 according to this embodiment of the invention. A storage unit 77 stores packets that are received or to be transmitted and management information. A CPU 78 performs a process of managing information stored in the storage unit 77, a packet transmitting/receiving process of composing, decomposing, or discarding packets, and a flow control process.

[Example of AGW]

FIG. 7 shows an example of the structure of an AGW (an AGW 2, an AGW 4, an AGW 8, or an AGW 12) according to this embodiment of the invention. In FIG. 7, an NW IF 86 is a network interface for connection to an access network. Packets having formats corresponding to each access network are transmitted or received through the NW IF 86. An NW IF 87 is a network interface for connection to a core network 1. IP packets are transmitted or received through the NW IF 87. A storage unit 82 stores management information, such as packets that are received or to be transmitted, address information, QoS information, and information required for flow control. A control unit 83 performs a process of managing information stored in the storage unit 82, a packet transmitting/receiving process of composing, decomposing, or discarding the packets transmitted to the access network and the IP packets, a flow control process, a process of measuring QoS, a process of determining a message transmitting chance, and a process of transmitting a message for requiring a handover to the HAT. A UIF 84 is a user interface. A timer 85 is a time counter, and is used to measure the time for which the packet is stored in the storage unit 82.

[Example of HA]

An HA 17 is a home agent of a mobile IP. FIG. 8 shows an example of the structure of the HA 17 according to this embodiment of the invention. In FIG. 8, an NW IF 90 is a network interface for connection to the core network 1. A storage unit 88 stores management information, such as packets that are received or to be transmitted, address information, QoS information, and information required for flow control. A control unit 89 performs a process of composing or decomposing packets, a process of analyzing messages, and a process of making messages, and a process of managing information stored in the storage unit.

[Example of CN]

FIG. 9 shows an example of the structure of a CN 16 that communicates with the HAT according to this embodiment of the invention. In FIG. 9, an NW IF 96 is a network interface for connection to the core network 1. A storage unit 92 stores information or packets that are received or to be transmitted. A control unit 93 performs a process of composing or decomposing packets, a process of managing information stored in the storage unit, and a process of executing various applications. A UIF 94 is a user interface. In this embodiment, the CN 16 is connected to the core network by wire, but the HAT may communicate with a wireless terminal.

[Example of Flow Control Corresponding to Priority]

Next, an example of flow control corresponding to priority according to this embodiment of the invention will be described below.

FIG. 10 shows a downstream (toward HAT) transmission buffer provided in each of the storage units of the AP, the PCF, the H/R, and the AGW (the storage unit 58, the storage unit 77 of the PCF, the storage unit 63 of the H/R, or the storage unit 82 of the AGW). Each of the control units of the AP, the PCF, the H/R, and the AGW (the control unit 57, the CPU 78 of the PCF, the control unit 65 of the H/R, or the control unit 83 of the AGW) stores a high-priority packet in a high-priority buffer 26 and a low-priority packet in a low-priority buffer 27, with reference to priority designated in the header of the transmission packet. In addition, each of the control units of the AP, the PCF, the H/R, and the AGW reads out the packet from the high-priority buffer 26 earlier than the packet in the low-priority buffer 27, and transmits the read packet in the downstream direction.

In FIG. 10, the packet of flow 1 has high priority, and the packet of flow 2 has low priority. The packet of the flow 1 is stored in the high-priority buffer 26, and the packet of the flow 2 is stored in the low-priority buffer 27. In addition, the packet of the flow 1 is transmitted toward the HAT earlier than the packet of the flow 2. The priority designated in the header, which is referred by the control unit, may be, for example, DSCP (DiffServ Code Point) of the IP packet.

User data is transmitted through the flow 2, and control data including a Hand Over Request (HOR) message, which will be described below, transmitted from the AGW to the HAT is transmitted through the flow 1. The user data is used for the user of the HAT to execute applications, such as audio conference or file download.

When traffic congestion occurs in a wireless transmission line, the amount of user data transmitted increases since the control data has higher priority. The amount of user data in the AP is larger than a predetermined value, the control unit 57 of the AP transmits a packet stop signal for flow control to the PCF or the H/R. The PCF or the H/R receives the packet stop signal and stores the packet of the user data in the downstream direction in the low-priority buffer 27. In addition, when the traffic congestion is not restored, the amount of packets of the user data stored in the storage unit of the PCF or the H/R is larger than a predetermined value, and the CPU 78 of the PCF or the control unit 65 of the H/R transmits a packet stop signal 23 to the AGW, as shown in FIG. 40.

Similarly, when traffic congestion occurs in a wire transmission line of the access network, the packet stop signal 23 for user data is transmitted to the AGW of each access network. For example, when traffic congestion occurs between the HAT 19 and the H/R 18, the H/R 18 starts to store the packets of the user data in the downstream direction in the low-priority buffer 27. In addition, when the traffic congestion is not restored, the amount of packets of the user data stored in the storage unit of the H/R is larger than a predetermined value, and the control unit 65 of the H/R 18 transmits the packet stop signal 23 to the AGW, as shown in FIG. 40.

The control unit 83 of the AGW receives the packet stop signal 23 and stores the packets of the user data in the downstream direction in the low-priority buffer 27. When the traffic congestion is not restored and the amount of packets of the user data stored in the storage unit 82 is larger than a predetermined value, the control unit 83 of the AGW transmits an HOR message as a packet of the flow 1. The HOR message is received by the PCF or the H/R and stored in the high-priority buffer 26. The HOR message is transmitted to the AP prior to information of the low-priority buffer 27. In addition, the HOR message is received by the AP and stored in the high-priority buffer 26. The HOR message is transmitted to the HAT prior to information of the low-priority buffer 27.

As such, when communication is not completely interrupted, the AGW can transmit the HOR message to the HAT even when the transmission of the user data is stopped due to flow control according to priority.

[Example of HO from 1xEv-DO to WLAN that Transmits HOR in Flow Control According to Priority]

FIG. 11 shows an example of a call flow when the AGW transmits an HOR message by the flow control according to priority and the HAT performs a handover from the 1xEv-DO system to the wireless LAN.

First, the HAT 19 is connected to the 1xEv-DO RAN 5 and communicates with the CN 16 by an IP flow (IP flow 101). The IP flow is a continuous series of IP packets of the same source address and destination address. In particular, the IP flow 101 is a series of IP packets including user data.

When traffic congestion occurs in a wireless transmission line of the 1xEv-DO or the 1xEv-DO RAN 5, the PCF 6 of the 1xEv-DO RAN 5 transmits a packet stop signal (Xoff) 102 for the IP flow 101 to the AGW 4.

The AGW 4 determines whether to transmit an HOR message for requesting a handover to the HAT 19. For example, the control unit 83 of the AGW 4 determines that an HOR message transmitting chance 103 is given when the capacity of the low-priority buffer 27 in the storage unit 82 is larger than a threshold value. When the HOR message transmitting chance 103 is given, the control unit 83 creates a packet 104 including the HOR message, and transmits it as control data to the HAT 19 through the NW IF 86.

The message format will be described below. FIG. 19 shows an example of the format of the packet 104. In addition, FIG. 23 shows an example of the format of the HOR message included in the packet 104.

The packet 104 is received by the 1xEv-DO IF 34 of the HAT 19 through the 1xEv-DO RAN 5. The control unit 31 of the HAT 19 analyzes the HOR message included in the packet 104, and determines an access system, which is a handover destination. It is assumed that the control unit 31 of the HAT 19 determines a wireless LAN as the access system, which is the handover destination. The control unit 31 of the HAT 19 transmits or receives a message string 105 required for the handover, and performs a predetermined handover disclosed in, for example, the NON-PATENT DOCUMENT 3. The HAT 19 is connected to the WLAN RAN 9, performs switching from the IP flow 101 to an IP flow 106, and communicates with the CN 16.

According to this embodiment, when each access system can absorb a traffic load, it is possible to prevent unnecessary switching to use the corresponding access system. Since one access system can be stably used, it is possible to reduce signaling overhead that accompanies the switching operation, the number of communication interruptions, or time.

Further, the access network transmits the message having higher priority than the user data. Therefore, if communication is not completely interrupted, the AGW can transmit a message for requiring a handover to a terminal even when the transmission of the user data is stopped.

[Example of HO from WLAN to 1xEv-DO that Transmits HOR in Flow Control According to Priority]

FIG. 12 shows an example of a call flow when the AGW transmits an HOR message by the flow control according to priority and the HAT performs a handover from the wireless LAN to the 1xEv-DO system. First, the HAT is connected to the WLAN RAN 9, and communicates with the CN 16 by the IP flow 107. The IP flow 107 is an IP packet string including user data.

When traffic congestion occurs in a wireless transmission line of the wireless LAN or the WLAN RAN 9, the H/R 10 of the WLAN RAN 9 transmits a packet stop signal 108 for the IP flow 107 to the AGW 8. The AGW 8 determines whether to transmit an HOR message for requesting a handover to the HAT 19. For example, the control unit 83 of the AGW 8 determines that an HOR message transmitting chance 109 is given when the capacity of the low-priority buffer 27 in the storage unit 82 is larger than a threshold value. When the HOR message transmitting chance 109 is given, the control unit 83 creates a packet 110 including the HOR message, and transmits it as control data to the HAT 19 through the NW IF 86. The packet 110 is received by the WLAN IF 39 of the HAT 19 through the WLAN RAN 9. The control unit 31 of the HAT 19 analyzes the HOR message included in the packet 110, and determines an access system, which is a handover destination. It is assumed that the control unit 31 of the HAT 19 determines a 1xEv-DO system as the access system, which is a handover destination. The control unit 31 of the HAT 19 transmits or receives a message string 111 required for the handover, and performs a predetermined handover disclosed in, for example, the NON-PATENT DOCUMENT 3. The HAT 19 is connected to the 1xEv-DO RAN 5, performs switching from the IP flow 107 to an IP flow 112, and communicates with the CN 16.

According to this embodiment, when each access system can absorb a traffic load, it is possible to prevent unnecessary switching to use the corresponding access system. Since one access system can be stably used, it is possible to reduce signaling overhead that accompanies the switching operation, the number of communication interruptions, or time.

Further, the access network transmits the message having higher priority than the user data. Therefore, if communication is not completely interrupted, the AGW can transmit a message for requiring a handover to a terminal even when the transmission of the user data is stopped.

[Example of HO from 1xEv-DO to WLAN that Transmits HOR Through Different Types of Systems]

Even when the communication of a certain access system is completely interrupted, the AGW can transmit an HOR message to the HAT through another access system. An example of the handover from the 1xEv-DO system to the wireless LAN in this case will be described below.

FIG. 13 shows an example of a call flow when the AGW of the 1xEv-DO system transmits an HOR message to the HAT 19 through the WLAN RAN 9, with the communication of the 1xEv-DO system being interrupted, and the HAT 19 performs a handover from the 1xEv-DO RAN 5 to the WLAN RAN 9.

When the HAT 19 enters a service area of the AP 7 of the 1xEv-DO RAN 5, the HAT 19 transmits or receives a message string 114 and performs a predetermined authentication procedure or a communication line establishment procedure. These procedures allow the IP address of the 1xEv-DO IF 34 of the HAT 19 to be settled. That is, in a destination network, a Care-of Address (CoA) of the mobile IP allocated to the 1xEv-DO IF 34 and the address of the home agent (HA 17) of the mobile IP used by the 1xEv-DO IF 34 are settled.

The HAT 19 transmits to the HA 17 a packet 115 including a Registration ReQuest (RRQ) message of the mobile IP and an AddRess (ADR) message, which is address information of an interface of an access system with which the HAT 19 can communicate other than the 1xEv-DO IF 34.

FIG. 15 shows an example of the format of the packet 115.

When receiving the packet 115, the control unit 83 of the AGW 4 analyzes the ADR message and registers information of the ADR message in an ADR table of the storage unit 82. In addition, the control unit 83 of the AGW 4 extracts only the registered ADR message from the packet 115 to create a packet 116, and transmits the packet 116 to the HA 17.

FIG. 16 shows an example of the format of the packet 116.

The HA 17 registers the IP address information of the 1xEv-DO IF 34 in a table of the storage unit 88, and responds to a Registration ResPonse (RRP) message 117 of the mobile IP. The RRQ message, the format of the RRQ message, and the process performed by the HA 17 may be defined by the mobile IP. FIGS. 20 and 21 show examples of the RRQ message and the format of the RRQ message, respectively.

The transmission and reception of an IP flow 118 starts between the HAT 19 and CN 16. The packet of the IP flow 118 transmitted from the CN to the HAT 19 is received by the NW IF 90 of the HA 17. The control unit 89 of the HA 17 encapsulates the packet to make an IP packet, sets a destination with reference to the address table of the storage unit 88, and transmits the packets through the NW IF 90. In addition, the packet of the IP flow 118 is received by the 1xEv-DO IF 34 of the HAT 19 through the AGW 4 and the 1xEv-DO RAN 5.

When the HAT 19 enters a service area of the AP 11 of the WLAN RAN 9, the HAT 19 transmits or receives a message string 119 and performs a predetermined authentication procedure or a communication line establishment procedure. These procedures allow the IP address of the WLAN IF 39 of the HAT 19 to be settled. That is, in a destination network, a Care-of Address (CoA) of the mobile IP allocated to the WLAN IP 39 and the address of the home agent (HA 17) of the mobile IP used by the WLAN IF 39 are settled. The HAT 19 transmits to the HA 17 a packet 120 including an RRQ message of the mobile IP and an ADR message, which is address information of an interface of an access system with which the HAT 19 can communicate other than the WLAN IF 39. Now, the HAT 19 transmits a message to add the address information of the 1xEv-DO IF 34.

FIG. 15 shows an example of the format of the packet 120.

When receiving the packet 120, the control unit 83 of the AGW 8 analyzes the ADR message and registers information of the ADR message in the ADR table of the storage unit 82. In addition, the control unit 83 of the AGW 8 extracts only the registered ADR message from the packet 120 to create a packet 121, and transmits the packet 121 to the HA 17.

FIG. 16 shows an example of the format of the packet 121.

The HA 17 registers the IP address information of the WLAN IF 39 in the table of the storage unit 88, and responds to an RRP message 122 of the mobile IP. FIGS. 20 and 21 show examples of the RRQ message and the format of the RRQ message, respectively.

The control unit 31 of the HAT 19 updates the address information stored in the AGWs of all the access systems connected thereto, according to the variation of the connection conditions. Since the number of interfaces of new access systems connected to the WLAN PAN 9 for communication increases, the HAT 19 transmits a packet 123 including an ADR message to the AGW 4 in order to add address information.

FIG. 17 shows an example of the format of the packet 123.

When receiving the packet 123, the control unit 83 of the AGW 4 analyses the message included in the packet and registers information of the ADR message in the ADR table of the storage unit 82. Now, the control unit 83 registers IP address information of the WLAN IF 39 in the ADR table of the storage unit 82.

Even after the HAT 19 is connected to the WLAN RAN 9, an IP flow 124 is transmitted or received between the HAT 19 and the CN 16 through the 1xEv-DO RAN 5. It is assumed that traffic congestion occurs in the wireless transmission line of the 1xEv-DO system or the 1xEv-DO RAN 5.

A packet stop signal 125 for the IP flow 118 is transmitted from the PCF 6 of the 1xEv-DO RAN 5 to the AGW 4. The AGW 4 determines whether an HOR message transmitting chance 126 for handover to the HAT 19 is given. An algorithm for determining the HOR message transmitting chance will be described below. For example, the control unit 83 of the AGW 4 determines that the HOR message transmitting chance 126 is given when the capacity of the buffer for transmitting the IP flow 118 provided in the storage unit 82 is larger than a threshold value. When the HOR message transmitting chance is given, the control unit 83 creates a packet 127 including the HOR message, and transmits the packet to the HAT 19 through the NW IF 87.

FIG. 19 shows an example of the format of the packet 127. FIG. 23 shows an example of the format of the HOR message included in the packet 127.

The control unit 83 sets the IP address information of the WLAN IF 39 updated with the packet 123 as a destination address of a header (IP header 214) of the packet 127, with reference to the ADR table of the storage unit 83. The packet 127 is transmitted to the HA 17 and is encapsulated according to the process of the mobile IP. Then, the packet is transmitted to the HAT 19. The encapsulated packet 128 is received by the WLAN IF 39 of the HAT 19 through the WLAN RAN 9. The control unit 31 of the HAT 19 analyzes the HOR message of the packet 128, and determines an access system, which is a handover destination. It is assumed that the control unit 31 of the HAT 19 determines a wireless LAN as the access system, which is the handover destination. In addition, the control unit 31 of the HAT 19 transmits or receives a message string 129 required for handover, and performs a predetermined handover procedure. The HAT 19 switches the IP flow 124 to an IP flow 130 passing through the WLAN RAN 9, and communicates with the CN 16.

According to this embodiment, when each access system can absorb a traffic load, it is possible to prevent unnecessary switching for using the corresponding access system. Even when the communication of the access system used is completely interrupted, it is possible to transmit messages through another access system, and thus the AGW can transmit a handover request message to the terminal. That is, when each access system cannot absorb a traffic load, switching from the access system that is currently being used to another access system is performed. Therefore, it is possible to reduce the possibility of the AGW of each of the access systems discarding the packets.

[Example of HO from WLAN to 1xEv-DO that Transmits HOR Through Different Types of Systems]

An example of handover from the wireless LAN to the 1xEv-DO system will be described below. FIG. 14 shows an example of a call flow when the AGW of the wireless LAN transmits an HOR message to the HAT 19 through the 1xEv- DO RAN 5, with the communication of the wireless LAN being interrupted, and the HAT 19 performs a handover from the WLAN RAN 9 to the 1xEv-DO RAN 5.

When the HAT 19 enters a service area of the AP 7 of the 1xEv-DO RAN 5, the HAT 19 transmits or receives a message string 134 and performs a predetermined authentication procedure or a communication line establishment procedure. These procedures allow the IP address of the 1xEv-DO IF 34 of the HAT 19 to be settled. That is, in a destination network, a Care-of Address (CoA) of the mobile IP allocated to the 1xEv-DO IF 34 and the address of the home agent (HA 17) of the mobile IP used by the 1xEv-DO IF 34 are settled.

The HAT 19 transmits to the HA 17 a packet 135 including an RRQ message of the mobile IP and an ADR message, which is address information of an interface of an access system with which the HAT 19 can communicate other than the 1xEv-DO IF 34.

FIG. 15 shows an example of the format of the packet 135.

When receiving the packet 135, the control unit 83 of the AGW 4 analyzes the ADR message and registers information of the ADR message in the ADR table of the storage unit 82. In addition, the control unit 83 of the AGW 4 extracts only the registered ADR message from the packet 135 to create a packet 136, and transmits the packet 136 to the HA 17.

FIG. 16 shows an example of the format of the packet 136.

The HA 17 registers the IP address information of the 1xEv-DO IF 34 in the table of the storage unit 88, and responds to a Registration ResPonse (RRP) message 137 of the mobile IP. The RRQ message, the format of the RRQ message, and the process performed by the HA 17 may be defined by the mobile IP.

FIGS. 20 and 21 show examples of the RRQ message and the format of the RRQ message, respectively.

When the HAT 19 enters a service area of the AP 11 of the WLAN RAN 9, the HAT 19 transmits or receives a message string 139 and performs a predetermined authentication procedure or a communication line establishment procedure. These procedures allow the IP address of the WLAN IF 39 of the HAT 19 to be settled. That is, in a destination network, a Care-of Address (CoA) of the mobile IP allocated to the WLAN IP 39 and the address of the home agent (HA 17) of the mobile IP used by the WLAN IF 39 are settled. The HAT 19 transmits to the HA 17 a packet 140 including an RRQ message of the mobile IP and an ADR message, which is address information of an interface of an access system with which the HAT 19 can communicate other than the WLAN IF 39. The HAT 19 transmits a message to add the address information of the 1xEv-DO IF 34.

FIG. 15 shows an example of the format of the packet 140.

When receiving the packet 140, the control unit 83 of the AGW 8 analyzes the ADR message and registers information of the ADR message in the ADR table of the storage unit 82. In addition, the control unit 83 of the AGW 8 extracts only the registered ADR message from the packet 140 to create a packet 141, and transmits the packet 141 to the HA 17.

FIG. 16 shows an example of the format of the packet 141.

The HA 17 registers the IP address information of the WLAN IF 39 in the table of the storage unit 88, and responds to an RRP message 142 of the mobile IP.

FIGS. 20 and 21 show examples of the RRQ message and the format of the RRQ message, respectively.

The control unit 31 of the HAT 19 updates the address information stored in the AGWs of all the access systems connected thereto, according to the variation of the connection conditions. Since the number of interfaces of new access systems connected to the WLAN RAN 9 for communication increases, the HAT 19 transmits a packet 143 including an ADR message to the AGW 4 in order to add address information.

FIG. 17 shows an example of the format of the packet 143.

When receiving the packet 143, the control unit 83 of the AGW 4 analyses the message included in the packet and registers information of the ADR message in the ADR table of the storage unit 82. Now, the control unit 83 registers the IP address information of the WLAN IF 39 in the ADR table of the storage unit 82.

After the HAT 19 is connected to the WLAN RAN 9, the transmission and reception of an IP flow 144 starts between the HAT 19 and CN 16. The packet of the IP flow 144 transmitted from the CN to the HAT 19 is received by the NW IF 90 of the HA 17. The control unit 89 of the HA 17 encapsulates the packet to make an IP packet, sets a destination with reference to the address table of the storage unit 88, and transmits the packet through the NW IF 90. In addition, the packet of the IP flow 144 is received by the WLAN IF 39 of the HAT 19 through the AGW 8 and the WLAN RAN 9.

It is assumed that traffic congestion occurs in the wireless transmission line of the 1xEv-DO system or the WLAN RAN 9. A packet stop signal 145 for the IP flow 144 is transmitted from the H/R 10 of the WLAN RAN 9 to the AGW 8. The AGW 8 determines whether an HOR message transmitting chance 146 for handover to the HAT 19 is given. For example, the control unit 83 of the AGW 8 determines that the HOR message transmitting chance 146 is given when the capacity of the buffer for transmitting the IP flow 144 provided in the storage unit 82 is larger than a threshold value. When the HOR message transmitting chance is given, the control unit 83 creates a packet 147 including the HOR message, and transmits the packet to the HAT 19 through the NW IF 87.

FIG. 19 shows an example of the format of the packet 147. FIG. 23 shows an example of the format of the HOR message included in the packet 147.

The control unit 83 sets the IP address information of the 1xEv-DO IF 34 as a destination address of a header (IP Header 214) of the packet 147, with reference to the ADR table of the storage unit 83. The packet 147 is transmitted to the HA 17 and is encapsulated according to the process of the mobile IP. Then, the packet is transmitted to the HAT 19. The encapsulated packet 148 is received by the 1xEv-DO IF 34 of the HAT 19 through the 1xEv-DO RAN 5. The control unit 31 of the HAT 19 analyzes the HOR message of the packet 148, and determines an access system, which is a handover destination. It is assumed that the control unit 31 of the HAT 19 determines a 1xEv-DO system as the access system, which is the handover destination. In addition, the control unit 31 of the HAT 19 transmits or receives a message string 149 required for handover, and performs a predetermined handover procedure. The HAT 19 switches the IP flow 144 to an IP flow 150 passing through the 1xEv-DO RAN 5, and communicates with the CN 16.

According to this embodiment, when each access system can absorb a traffic load, it is possible to prevent unnecessary switching for using the corresponding access system. Even when the communication of the access system used is completely interrupted, it is possible to transmit messages through another access system, and thus the AGW can transmit a handover request message to the terminal. That is, when each access system cannot absorb a traffic load, switching from the access system that is currently being used to another access system is performed. Therefore, it is possible to reduce the possibility of the AGW of each of the access systems discarding the packets.

[Example of Format of RRQ+ADR Packets]

FIG. 15 shows an example of the format of the packets 115 and 135 including the RRQ message and the ADR message. An IP header 201 is a header of an IP packet. A UDP header 202 is a header of a User Datagram Protocol (UDP) packet. An RRQ 203 indicates an RRQ message. An ADR 204 indicates an ADR message.

[Example of Format of RRQ Packet]

FIG. 16 shows an example of the format of the packet including the RRQ message. An IP header 205 is a header of an IP packet. A UDP header 206 is a header of a User Datagram Protocol (UDP) packet. An RRQ 207 indicates an RRQ message.

[Example of Format of ADR Packet]

FIG. 17 shows an example of the format of the packet including the ADR message. An IP header 208 is a header of an IP packet. A UDP header 209 is a header of a User Datagram Protocol (UDP) packet. An ADR 210 indicates an ADR message.

[Example of Format of RRP Packet]

FIG. 18 shows an example of the format of the packet including the RRP message. An IP header 211 is a header of an IP packet. A UDP header 212 is a header of a User Datagram Protocol (UDP) packet. An RRP 213 indicates an RRP message.

[Example of Format of HOR Packet]

FIG. 19 shows an example of the format of the packet including the HOR message. An IP header 214 is a header of an IP packet. A UDP header 215 is a header of a User Datagram Protocol (UDP) packet. A HOR 216 indicates an HOR message.

[Example of Format of RRQ Message]

FIG. 20 shows an example of the format of the RRQ message. A Control field 221 indicates control information and includes an identifier indicating the RRQ message. An HoA (Home address) field 222 indicates the home address of the interface of the HAT. In this embodiment, the interface of the HAT is any one of the 1xEv-DO IF 34, the WLAN IF 39, the WiMAX IF 44, and the wire-line IF 49. An HA 223 indicates the address of a home agent. A CoA 224 indicates the care-of address of the interface of the HAT. An ID 225 is information for checking whether the message is correct.

[Example of Format of RRP Message]

FIG. 21 shows an example of the format of the RRP message. A Control field 231 indicates control information and includes an identifier indicating the RRP message. A HoA field (Home address) 232 indicates the home address of the interface of the HAT. In this embodiment, the interface of the HAT is any one of the 1xEv-DO IF 34, the WLAN IF 39, the WiMAX IF 44, and the wire-line IF 49. An HA 233 indicates the address of a home agent. A CoA field 234 indicates the care-of address of the interface of the HAT. An ID field 235 indicates information for checking whether the message is correct.

[Example of Format of ADR Message]

FIG. 22 shows an example of the format of the ADR message transmitted from the HAT to the AGW. A Control field 240 indicates control information, and includes an identifier indicating the ADR message and a flag designating whether to add the next address information to the ADR table stored in the storage unit 82 of the AGW or discard the address information. A NumAddr field 241 indicates the number of sets of the next address information. In this embodiment, n sets of address information are continued.

Address information is designated in AddrInfo_1, AddrInfo_2, and AddrInfo_n in the format of a structure 239. An HAT ID field 245 indicates a unique identifier of the HAT. A Sys ID field 246 indicates an identifier for specifying the kind of interface of the HAT. For example, the Sys ID field 246 specifies the wire-line access network, the 1xEv-DO system, the wireless LAN, or the WiMAX system. A HoA (home address) field 247 indicates the home address of the interface of the HAT. An HA field 248 indicates the address of the home agent. A CoA field 249 indicates the care-of address of the interface of the HAT.

For example, an example in which the HAT 19 sets the IP address information of the WLAN IF 39 in the table of the AGW using the packet 123 will be described below. The control unit 31 of the HAT 19 sets the flag of the Control 240 such that the next address information is added to the ADR table. Since the address information of one wireless LAN interface is transmitted, the control unit 31 sets '1' to the NumAddr field 241. The next address information is only AddrInfo_1. It is assumed that, as the IP address of the WLAN IF 39, the home address is HoA_1, the home agent address is HA_1, and the care-of address is CoA_1. The control unit 31 sets an identifier of the HAT 19 to the HAT ID field 245, and sets an identifier indicating the wireless LAN to the Sys ID field 246. The control unit 31 sets HoA_1, HA_1, and CoA_1 to the HoA field 247, the HA field 248, and the CoA field 249, respectively.

The control unit 31 of the HAT 19 may set the flag of the Control 240 such that the next address information is deleted from the ADR table. In this case, the control unit 83 of the AGW 4 receiving the packet 123 deletes the next address information from the ADR table of the storage unit 82 according to the flag of the Control 240.

[Example of Format of HOR Message]

FIG. 23 shows an example of the format of the HOR message for the AGW to request the HAT to perform a handover. A Control field 251 indicates control information, and includes an identifier indicating the HOR message and an identifier indicating the format of the next message. A SsysInfo field 252 indicates information of an access system, which is a handover source. An HAT ID field 253 indicates an identifier of the HAT requesting handover. A Sys ID field 254 indicates an identifier of the access system, which is a handover source.

For example, an example in which the AGW 4 of the 1xEv-DO system requests the HAT 19 to perform a handover to access systems other than the 1xEv-DO system using a packet 104 will be described below. The control unit 83 of the AGW 4 sets the identifier of the HAT 19 to the HAT ID field 253, and sets an identifier indicating the 1xEv-DO system to the Sys ID field 254. The control unit 31 of the HAT 19 having received the packet 104 analyzes the message, selects one available access system other than the access system designated by the Sys ID field 254, and performs a handover to the selected access system. In this embodiment, the 1xEv-DO system is set to the Sys ID field 254. For example, assuming that only the wireless LAN is available other than the 1xEv-DO system, the HAT 19 selects the wireless LAN and starts the handover.

FIG. 24 shows another example of the format of the HOR message. A Control field 255 indicates control information, and includes an identifier indicating the HOR message and an identifier indicating the format of the next message. A SsysInfo field 252 indicates information of an access system, which is a handover source, similar to FIG. 23. An HAT ID field 253 indicates an identifier of the HAT requesting handover. A Sys ID field 254 indicates an identifier of the access system, which is a handover source. A TsysInfo field 256 indicates information of an access system, which is a handover source. An HAT ID field 257 indicates an identifier of the HAT requesting handover. A Sys ID field 258 indicates an identifier of the access system, which is a handover source.

An example in which the AGW 4 of the 1xEv-DO system requests the HAT 19 to perform a handover to the WLAN RAN 9 using a packet 127 will be described below. The control unit 83 of the AGW 4 sets the identifier of the HAT 19 to the HAT ID field 253, and sets an identifier indicating the 1xEv-DO system to the Sys ID field 254. In addition, the control unit 83 of the AGW 4 sets the identifier of the HAT 19 to the HAT ID field 257, and sets an identifier indicating the wireless LAN to the Sys ID field 258.

This message is converted into a packet 128 by the HA 17 and then transmitted to the HAT 19. The control unit 31 of the HAT 19 having received the packet 128 analyzes the message, and starts a handover to the access system designated by the TsysInfo field 256. Since an identifier indicating the wireless LAN is set to the Sys ID field 258 of the TsysInfo field 256, the control unit 31 of the HAT 19 starts a handover to the WLAN RAN 9. In this embodiment, the message includes information (SsysInfo field 252) of the access system, which is a handover source, and information (TsysInfo field 256) of the access system, which is a handover destination. However, the message may not include the information of the access system, which is a handover source.

FIG. 25 shows still another example of the format of the HOR message. A Control field 259 indicates control information, and includes an identifier indicating the HOR message and an identifier indicating the format of the next message. A SsysInfo field 252 indicates information of an access system, which is a handover source, similar to FIG. 23. A TsysList field 260 indicates information of plural access systems, which are handover destinations, and the format thereof is shown in FIG. 26. A TsysNum field 261 indicates the number of access systems, which are the handover destinations. A TSysInfo_1 field, a TSysInfo_2 field, and a TSysInfo_k field indicate information of the access systems, which are the handover destinations, and the format thereof is the same as that of the TsysInfo field 256. That is, each of the TSysInfo_1 field, the TSysInfo_2 field, and the TSysInfo_k field includes the HAT ID field 257 and the Sys ID field 258. The HAT ID field 257 indicates an identifier of the HAT requesting handover, and the Sys ID field 258 indicates an identifier of the access system, which is a handover destination.

An example in which the AGW 4 of the 1xEv-DO system requests the HAT 19 to perform a handover to any one of three access systems, that is, the WLAN RAN 9, the WiMAX RAN 13, and the wire-line access network 3 will be described below. The control unit 83 of the AGW 4 can select the access systems, which are handover destinations, from the ADR table of the storage unit 82. The control unit 83 of the AGW 4 sets an identifier of the HAT 19 to the HAT ID field 253, and sets an identifier indicating the 1xEv-DO system to the Sys ID field 254. In addition, the control unit 83 of the AGW 4 sets '3' to the TsysNum field 261. The control unit 83 of the AGW 4 sets the identifier of the HAT 19 to the HAT ID field 257 of the TSysInfo_1 field and sets an identifier indicating the wireless LAN to the Sys ID field 258. The control unit 83 of the AGW 4 sets the identifier of the HAT 19 to the HAT ID field 257 of the TSysInfo_2 field and sets an identifier indicating the WiMAX system to the Sys ID field 258. The control unit 83 of the AGW 4 sets the identifier of the HAT 19 to the HAT ID field 257 of the TSysInfo_3 field and sets an identifier indicating the wire-line access network to the Sys ID field 258.

The HAT 19 receiving the message selects one access system from the wireless LAN, the WiMAX system, and the wire-line access network, and starts a handover. The HAT 19 may select the access system in the order of TSysInfo_1, TSysInfo_2, and TSysInfo_3. In this case, the control unit 31 of the HAT 19 selects the identifier indicating the wireless LAN that is set to the Sys ID field 258 of the TSysInfo_1 field, and starts a handover to the WLAN RAN 9.

Only the identifier of the HAT (HAT ID) and the identifier of the access system (Sys ID) are stored in the SsysInfo field 252 and the TsysInfo field 256 etc of the HOR messages shown FIGS. 23, 24, 25, and 26. However, IP address information (HoA, HA, and CoA) may be additionally stored in these fields. When creating the HOR message, the control unit 83 of the AGW can obtain this information with reference to the ADR table stored in the storage unit 82.

[Example of AGW QoS Table]

FIGS. 27 and 28 show an example of QoS information stored in the storage unit 82 of the AGW 4. The AGW 4 manages QoS information (R QoS: Requested QoS) requested by the HAT 19 and QoS information (G QoS: Granted QoS) granted by the network. An example of exchange between the QoS information items is disclosed in X.P0011-D, Chapter 4. For example, it is assumed that the exchange between the QoS information items is performed by the message exchange represented by reference numeral 114 in FIG. 13.

FIG. 27 shows an example of the format of R QoS. A User ID field 270 indicates a user identifier of the HAT 19. A Num Flow field 271 indicates the number of IP flows stored in the R QoS. In this embodiment, the number of flows is j. QoS requested by the HAT 19 for each flow is designated to an R QoS (Flow ID 1) field 272, an R QoS (Flow ID 2) field 273, ..., an R QoS (Flow ID j) field 274.

For example, the R QoS (Flow ID 1) field is a structure 296 in which QoS requested by the HAT 19 is designated for an IP flow having a flow ID of 1. This is similarly applied to the case in which a flow ID is equal to or greater than 2. A Flow ID field 275 indicates an identifier of the IP flow to which QoS designated to the structure 296 is applied. An information length (Length) field 276 indicates the sum of the lengths of information items 276, 277, 278, 279, ..., 280. A Num Set field 277 indicates the number of sets of QoS parameters stored in the structure 296. In this embodiment, it is assumed that the number of sets is m. Sets of QoS parameters requested by the HAT 19 are designated to an R QoS (Set ID 1) field 278, an R QoS (Set ID 2) field 279, ..., an R QoS (Set ID m) field 280. The HAT 19 designates the R QoS (Set ID I) field 278, the R QoS (Set ID 2) field 279, ..., the R QoS (Set ID m) field 280 in the desired order.

For example, the R QoS (Set ID 1) field indicates a structure 297 in which a QoS parameter having a set ID of 1 is designated. The format of the structure is the same as that in which a set ID is equal to or greater than 2. A Set Length field 281 indicates the sum of the lengths of information items in the structure 297. A Set ID field indicates an identifier of the set of QoS parameters stored in the structure 297. A Traffic class field 283 designates a traffic class, such as conversation, streaming, or background. A Priority field 284 designates priority for granting QoS and allocating a wireless resource. A Peak rate field 285 designates a transmission rate at the time of peak. A Max latency field 286 designates an allowable maximum latency. A Max loss rate field 287 designates an allowable maximum data loss rate. A Max jitter field 288 designates an allowable maximum jitter.

FIG. 28 shows an example of the format of G QoS. A User ID field 289 indicates a user identifier of the HAT 19. A Num Flow field 290 indicates the number of IP flows stored in the G QoS. In this embodiment, the number of flows is j. QoS allocated to the IP flows having flow IDs of 1, 2, ..., j is designated to a G QoS (Flow ID 1) field 291, a G QoS (Flow ID 2) field 292, . . . , a G QoS (Flow ID j) field 293.

For example, the G QoS (Flow ID 1) field indicates a structure 298 in which QoS allocated to the IP flow having a flow ID of 1 is designated. The format of the structure is the same as that in which a flow ID is equal to or greater than 2. A Flow ID field 294 indicates an identifier of the IP flow to which QoS designated to the structure 298 is applied. A Set ID field 295 indicates an identifier indicating a set of QoS parameters.

[Example of AGW ADR Table]

FIGS. 29, 30, 31, and 32 show examples of the ADR table stored in the storage unit 82 of the AGW. The control unit 83 of the AGW receives the ADR message shown in FIG. 22 from the HAT, and registers information in the ADR table. In these examples, it is premised that the HATs 19 and 20 are connected to the access networks, as shown in FIG. 34.

That is, the HAT 19 is connected to the 1xEv-DO RAN 5, the WLAN RAN 9, and the wire-line access network 3. The home address (HoA) of the 1xEv-DO IF 34 of the HAT 19 is HoA_5, the home agent address (HA) is HA_5, and the care-of address (CoA) is CoA_5. The home address (HoA) of the WLAN IF 39 of the HAT 19 is HoA_1, the home agent address (HA) is HA_1, and the care-of address (CoA) is CoA_1. The home address (HoA) of the wire-line IF 49 of the HAT 19 is HoA_2, the home agent address (HA) is HA_2, and the care-of address (CoA) is CoA_2.

The HAT 20 is connected to the 1xEv-DO RAN 5, the WLAN RAN 9, and the WiMAX RAN 13. The home address (HoA) of the 1xEv-DO IF 34 of the HAT 20 is HoA_6, the home agent address (HA) is HA_6, and the care-of address (CoA) is CoA_6. The home address (HoA) of the WLAN IF 39 of the HAT 20 is HoA_3, the home agent address (HA) is HA_3, and the care-of address (CoA) is CoA_3. The home address (HoA) of the WiMAX IF 44 of the HAT 20 is HoA_4, the home agent address (HA) is HA_4, and the care-of address (CoA) is CoA_4.

FIG. 29 shows an example of the ADR table recorded in the storage unit 82 of the AGW 4. An HAT ID field 301 indicates an identifier of the HAT. A Sys ID field 302 indicates an identifier of the access system. An HoA field 303 indicates a home address. An HA field 304 indicates an address of a home agent. A CoA field 305 indicates a care-of address. Information in a row 310 is the address information of the WLAN IF 39 of the HAT 19. Information in a row 311 is the address information of the wire-line IF 49 of the HAT 19. Information in a row 312 is the address information of the WLAN IF 39 of the HAT 20. Information in a row 313 is the address information of the WiMAX IF 13 of the HAT 20.

FIG. 30 shows an example of the ADR table recorded in the storage unit 82 of the AGW 8. An HAT ID field 301 indicates an identifier of the HAT. A Sys ID field 302 indicates an identifier of the access system. An HoA field 303 indicates a home address. An HA field 304 indicates an address of a home agent. A CoA field 305 indicates a care-of address. Information in a row 314 is the address information of the 1xEv-DO IF 34 of the HAT 19. Information in a row 315 is the address information of the wire-line IF 49 of the HAT 19. Information in a row 316 is the address information of the 1xEv-DO IF 34 of the HAT 20. Information in a row 317 is the address information of the WiMAX IF 13 of the HAT 20.

FIG. 31 shows an example of the ADR table recorded in the storage unit 82 of an AGW 2. An HAT ID field 301 indicates an identifier of the HAT. A Sys ID field 302 indicates an identifier of the access system. An HoA field 303 indicates a home address. An HA field 304 indicates an address of a home agent. A CoA field 305 indicates a care-of address. Information in a row 318 is the address information of the WLAN IF 39 of the HAT 19. Information in a row 319 is the address information of the 1xEv-DO IF 34 of the HAT 19. Since the HAT 20 is not connected to the AGW 2, address information related to the HAT 20 is not registered in the table.

FIG. 32 shows an example of the ADR table recorded in the storage unit 82 of an AGW 12. An HAT ID field 301 indicates an identifier of the HAT. A Sys ID field 302 indicates an identifier of the access system. An HoA field 303 indicates a home address. An HA field 304 indicates an address of a home agent. A CoA field 305 indicates a care-of address. Information in a row 320 is the address information of the 1xEv-DO IF 34 of the HAT 20. Information in a row 321 is the address information of the WLAN IF 39 of the HAT 20. Since the HAT 19 is not connected to the AGW 12, address information related to the HAT 19 is not registered in the table.

FIGS. 29, 30, 31, and 32 show examples in which one IP address corresponds to each of the interfaces of the access systems of the HATs 19 and 20. However, plural IP addresses may be allocated to the interface of one access system. In this case, in the storage unit 83 of the AGW 8, IP address information is also included in the HOR message. Therefore, it is possible to request the HAT to perform a handover in the unit of IP flow.

The control unit 83 of the AGW adds information to ADR table or deletes information from the ADR table according to the flag in the Control field 240 of the ADR message. When a predetermined time has elapsed after the communication of a certain IP flow is interrupted, the control unit 83 of the AGW may delete the address information of the IP flow from the ADR table. The AGW can count the time for which each IP flow does not communicate using the timer 85.

[Example of HA Table]

FIG. 33 shows an example of the address information table of the HAT recorded in the storage unit 88 of the HA 17. The control unit 89 of the HA 17 registers information of the RRQ message received by the NW IF of the HAT in the table.

In the example, it is premised that the HATs 19 and 20 are connected to the access networks, as shown in FIG. 34. A Control field 331 indicates control information. An HoA field 332 indicates the home address of the HAT for the interface of the access system.

In this embodiment, the interface is any one of the 1xEv-DO IF 34, the WLAN IF 39, the WiMAX IF 44, and the wire-line IF 49. An HA field 333 indicates the address of the home agent of the interface. A CoA field 334 indicates the care-of address of the interface. An ID field 335 indicates information for checking whether the message is correct. Information in a row 341 is the address information of the WLAN IF 39 of the HAT 19. Information in a row 342 is the address information of the wire-line IF 49 of the HAT 19. Information in a row 343 is the address information of the WLAN IF 39 of the HAT 20. Information in a row 344 is the address information of the WiMAX IF 13 of the HAT 20. Information in a row 345 is the address information of the 1xEv-DO IF 34 of the HAT 19. Information in a row 346 is the address information of the 1xEv-DO IF 34 of the HAT 20.

[Example of Algorithm for Determining HOR Transmitting Chance]

FIG. 35 shows an example of an algorithm for determining an HOR message transmitting chance performed by the control unit 83 of the AGW. In Step 1, it is determined whether an IP flow 144 is in an Xoff state. The Xoff state means that the AGW receives a packet transmission stop signal 23 for the IP flow, but does not receives a packet transmission resume signal 24.

If the IP flow is in the Xoff state, in Step 2, the control unit 83 of the AGW determines whether the capacity of the buffer transmitting the IP flow 144 provided in the storage unit 82 is larger than a threshold value. If it is determined that the capacity of the buffer transmitting the IP flow 144 provided in the storage unit 82 is larger than the threshold value, in Step 3, the control unit 83 of the AGW transmits an HOR message. For example, the control unit 83 creates a packet 147 including the HOR message, and transmits the packet to the HAT 19 through the NW IF 87.

In this flow, Step 2 may not be performed, and Step 1 may directly proceed to Step 3 if the IP flow is in the Xoff state. When a large load is applied to the access network, the AGW may transmit the HOR message at the beginning, without depending on the state of the transmission buffer.

FIG. 36 shows another example of the algorithm for determining the HOR message transmitting chance performed by the control unit 83 of the AGW. In Step 1, it is determined whether the IP flow 144 is in an Xoff state. The Xoff state means that the AGW receives a packet transmission stop signal 23 for the IP flow, but does not receives the packet transmission resume signal 24. If the IP flow is in the Xoff state, in Step 2, the control unit 83 of the AGW determines whether the capacity of the buffer transmitting the IP flow 144 provided in the storage unit 82 is larger than a threshold value. If it is determined that the capacity of the buffer transmitting the IP flow 144 provided in the storage unit 82 is larger than the threshold value, in Step 4, the control unit 83 determines whether to perform the handover of the IP flow 144.

For example, in Step 4, when the control unit 83 generates uniform random numbers [0, 1] and the random numbers are larger than 0.5, the control unit determines to perform the handover of the IP flow 144.

In Step 4, if it is determined to perform the handover of the IP flow 144, in Step 3, the control unit 83 of the AGW transmits the HOR message. For example, the control unit 83 creates a packet 147 including the HOR message, and transmits the packet to the HAT 19 through the NW IF 87. As shown in FIG. 35, when a handover is collectively performed on all the IP flows satisfying the conditions, the handover is performed on the same destination, which results in load concentration. In Step 4 of FIG. 36, it is possible to distribute the load by selecting the IP flow subjected to handover.

As such, according to this embodiment, the AGW randomly determines the message transmitting chance during the determination of a predetermined message transmitting chance. When the AGW collectively performs a handover on all the IP flows having received the packet transmission stop signals, a load may be concentrated on the handover destination. However, since the handover is randomly performed, it is possible to distribute the load.

FIG. 37 shows still another example of the algorithm for determining the HOR message transmitting chance performed by the control unit 83 of the AGW. In Step 1, it is determined whether the IP flow 144 is in an Xoff state. The Xoff state means that the AGW receives a packet transmission stop signal 23 for the IP flow, but does not receives the packet transmission resume signal 24. If the IP flow is in the Xoff state, in Step 5, the control unit 83 of the AGW examines the deterioration of QoS of the IP flow 144. If deterioration of QoS of the IP flow 144 is detected, in Step 3, the control unit 83 of the AGW transmits the HOR message. For example, the control unit 83 creates the packet 147 including the HOR message, and transmits the packet to the HAT 19 through the NW IF 87.

As an example of Step 5, the control unit 83 of the AGW measures the loss rate of the IP packet of the IP flow 144 stored in the storage unit 82. In addition, the control unit 83 compares the measure loss rate of the IP packet with the loss rate (Max loss rate 287) of the IP packet granted by the IP flow 144, and determines whether the measure loss rate of the IP packet is higher than the Max loss rate 287. When it is determined that the measured loss rate is higher than the Max loss rate 287, the control unit determines that QoS of the IP flow 144 deteriorates.

As another example of Step 5, the control unit 83 of the AGW measures the retention time for which the IP packet of the IP flow 144 is stored in the storage unit 82. In addition, the control unit 83 compares the measured retention time of the IP packet with an allowable maximum latency (Max latency 286) of the IP packet granted by the IP flow 144, and determines whether the measured retention time of the IP packet is longer than the Max latency 286. When the measured retention time is longer than the Max latency 286, the control unit determines that QoS of the IP flow 144 deteriorates.

As such, according to this embodiment, when the measure communication quality is lower than QoS stored in the storage unit, the AGW determines that the message transmitting chance is given. When each access system cannot absorb a traffic load and the communication quality deteriorates, the access system that is currently being used is switched to another access system. Therefore, it is possible to prevent the deterioration of the communication quality.

FIG. 38 shows yet another example of the algorithm for determining the HOR message transmitting chance performed by the control unit 83 of the AGW. In Step 1, it is determined whether the IP flow 144 is in an Xoff state. The Xoff state means that the AGW receives the packet transmission stop signal 23 for the IP flow, but does not receives the packet transmission resume signal 24. If the IP flow is in the Xoff state, in Step 6, the control unit 83 of the AGW determines whether to perform a handover on a QoS parameter of the IP flow 144. When it is determined that a handover should be performed on the QoS parameter of the IP flow 144, in Step 2, the control unit 83 of the AGW determines whether the capacity of the buffer transmitting the IP flow 144 provided in the storage unit 82 is larger than a threshold value. If it is determined that the capacity of the buffer transmitting the IP flow 144 provided in the storage unit 82 is larger than the threshold value, in Step 3, the control unit 83 of the AGW transmits the HOR message. For example, the control unit 83 creates the packet 147 including the HOR message, and transmits the packet to the HAT 19 through the NW IF 87.

For example, in Step 6, the control unit 83 determines whether to perform a handover on the QoS parameter, on the basis of the QoS information of the IP flow 144 stored in the storage unit 82. The control unit 83 can specify the QoS parameter allocated to the IP flow 144, on the basis of a Set ID field 295 for the IP flow 144 of G_QoS. The control unit 83 searches a QoS parameter set 297 corresponding to a Set ID field 295 from a Set ID field 282 of R_QoS. Further, for example, when the value of a priority 284 is larger than a predetermined value, the control unit 83 performs a handover on the IP Flow 144 on the basis of the priority 284 of the searched QoS parameter set 297.

As another example of Step 6, the control unit 83 searches a QoS parameter set 297 corresponding to a Set ID field 295 from a Set ID field 282 of R_QoS. For example, the control unit 83 performs a handover on the IP flow 144 only when the value of a Traffic class field 283 is not 'background', on the basis of the value of the Traffic class field 283 of the searched QoS parameter set 297.

As still another example of Step 6, the control unit 83 searches a QoS parameter set 297 corresponding to the Set ID field 295 from the Set ID field 282 of R_QoS. For example, the control unit 83 performs a handover on the IP flow 144 when the value of the Max loss rate field 287 is smaller than a predetermined value, on the basis of the value of the Max loss rate field 287 of the searched QoS parameter set 297.

As yet another example of Step 6, the control unit 83 searches a QoS parameter set 297 corresponding to the Set ID field 295 from the Set ID field 282 of R_QoS. For example, the control unit 83 performs a handover on the IP flow 144 when the value of the Max latency field 287 is smaller than a predetermined value, on the basis of the value of the Max latency field 287 of the searched QoS parameter set 297.

As such, according to this embodiment, the AGW can perform a handover between different types of access systems only when it is necessary to maintain the communication quality provided to a terminal.

FIG. 39 shows still yet another example of the algorithm for determining the HOR message transmitting chance performed by the control unit 83 of the AGW. In Step 1, it is determined whether the IP flow 144 is in an Xoff state. The Xoff state means that the AGW receives the packet transmission stop signal 23 for the IP flow, but does not receives the packet transmission resume signal 24. If the IP flow is in the Xoff state, in Step 6, the control unit determines whether to perform a handover on a QoS parameter of the IP flow 144. When it is determined that a handover should be performed on the QoS parameter of the IP flow 144, in Step 5, the control unit 83 of the AGW examines the deterioration of QoS of the IP flow 144. If the deterioration of QoS of the IP flow 144 is detected, in Step 3, the control unit 83 of the AGW transmits the HOR message. For example, the control unit 83 creates the packet 147 including the HOR message, and transmits the packet to the HAT 19 through the NW IF 87.

As such, according to this embodiment, the AGW determines that the message transmitting chance is given when the measured communication quality is lower than that stored in the storage unit. When each access system cannot absorb a traffic load and the communication quality deteriorates, the access system that is currently being used is switched to another access system. Therefore, it is possible to prevent the deterioration of the communication quality.

Further, according to this embodiment, the AGW can perform a handover between different types of access systems only when it is necessary to maintain the communication quality provided to a terminal.

In FIG. 1, the AGW is separated from the PCF or the H/R, but the AGW may be integrally formed with the PCF or the H/R. In this case, it is determined whether the HOR message transmitting chance is given on the basis of whether the packet stop signal transmitted from the AP, not the packet stop signal transmitted from the integrated structure of the AGW and the PCF or the H/R, is received.

Furthermore, in FIG. 1, for example, the wire-line access network, the 1xEv-DO system, the wireless LAN, and the WiMAX system are used as communication methods between the HAT and the access network, but radio communication methods to which the invention is applied are not limited thereto. For example, the invention can be applied to other radio communication methods, such as PHS, GSM, and W-CDMA.

BRIEF DESCRIPTION OF THE DRAWINGS

FIG. 27 is a diagram illustrating an example of a table of an access gateway according to the invention;

FIG. 28 is a diagram illustrating another present example of the table of the access gateway according to the invention;

FIG. 29 is a diagram illustrating still another example of the table of the access gateway according to the present invention;

FIG. 30 is a diagram illustrating yet another example of the table of the access gateway according to the present invention;

FIG. 31 is a diagram illustrating still yet another example of the table of the access gateway according to the present invention;

FIG. 32 is a diagram illustrating yet still another example of the table of the access gateway according to the present invention;

FIG. 33 is a diagram illustrating an example of a table of a home agent according to the present invention;

FIG. 38 is a flowchart illustrating an algorithm for determining a signal transmitting chance according to yet another embodiment of the present invention;

FIG. 39 is a flowchart illustrating an algorithm for determining a signal transmitting chance according to still yet another embodiment of the present invention.

EXPLANATION OF LETTERS OR NUMERALS

Figure 1:
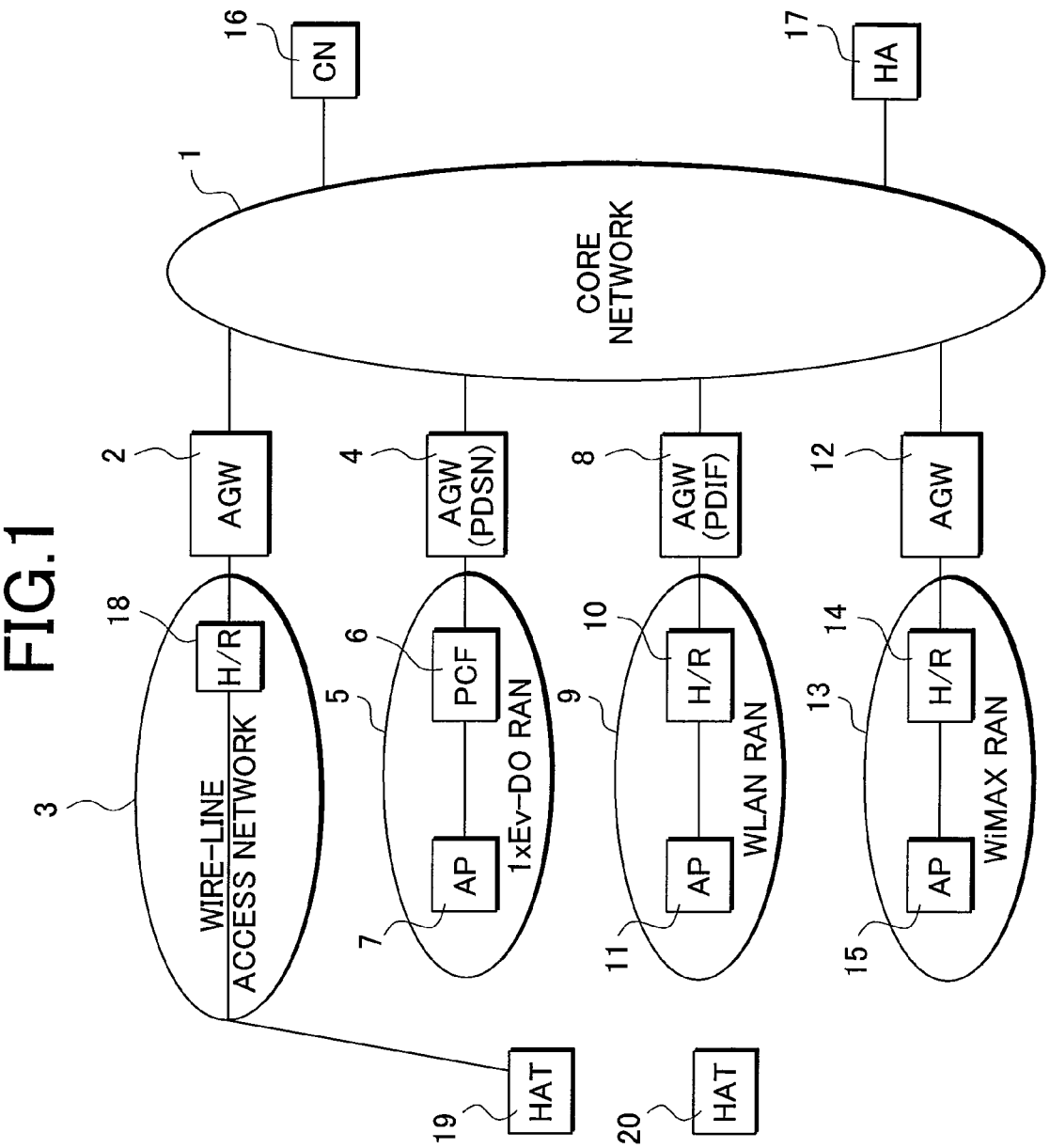
FIG. 1 is a diagram illustrating an example of the structure of a wireless system according to the present invention.
Figure 2:
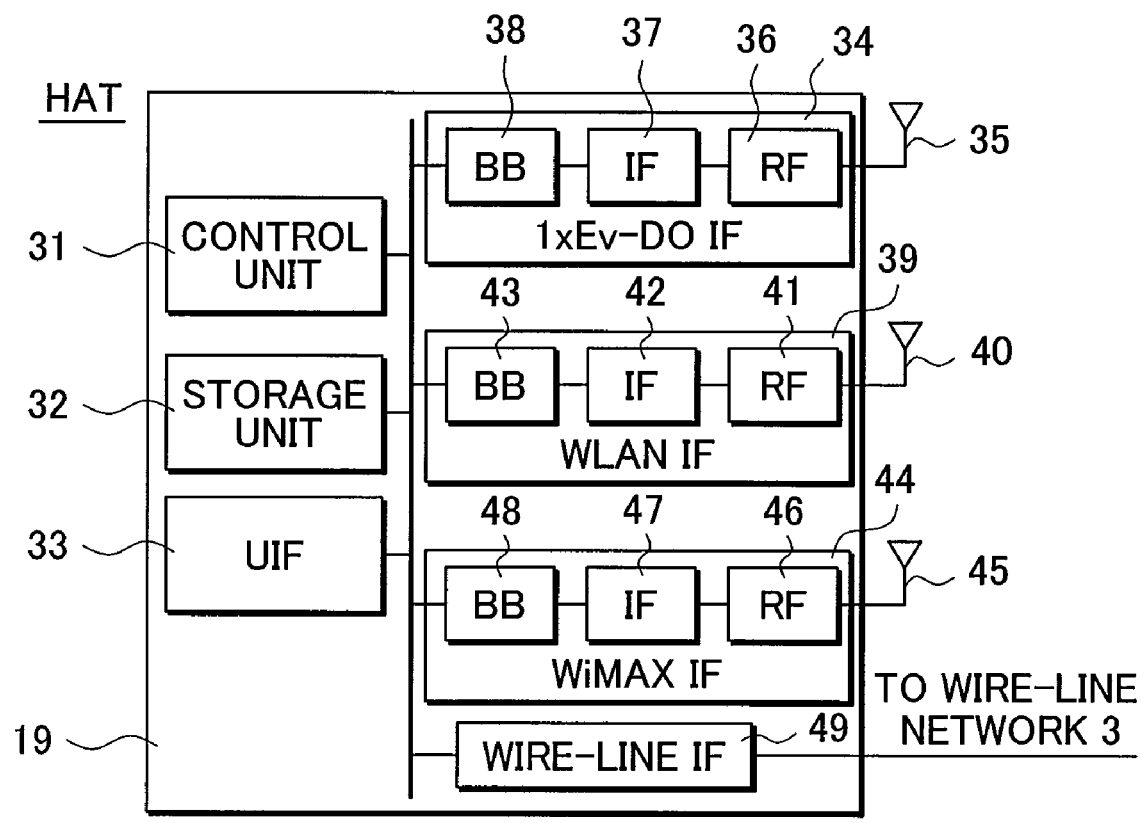
FIG. 2 is a diagram illustrating an example of the structure of a terminal according to a first embodiment of the present invention.
Figure 3:
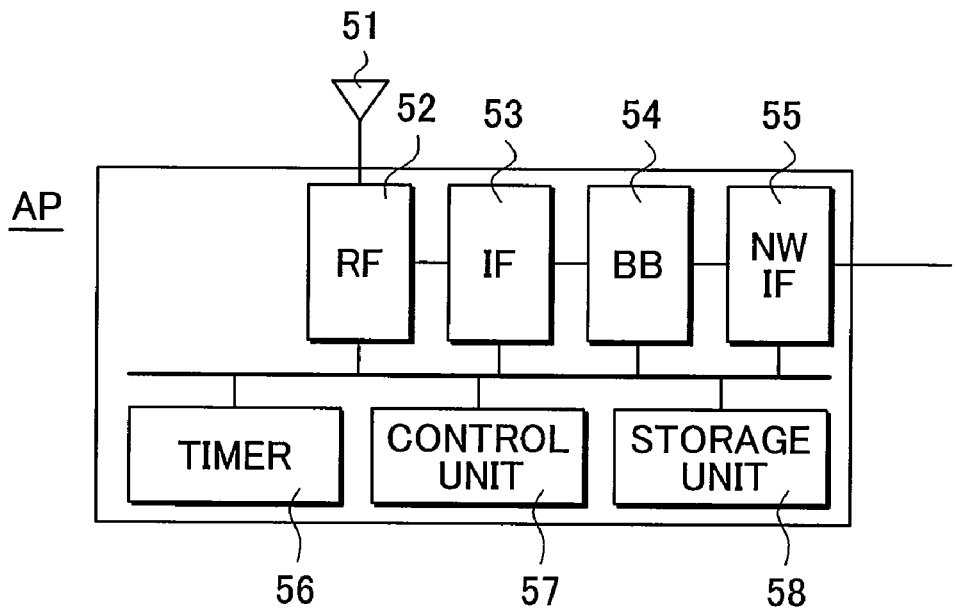
FIG. 3 is a diagram illustrating an example of the structure of a base station according to the first embodiment of the present invention.
Figure 4:
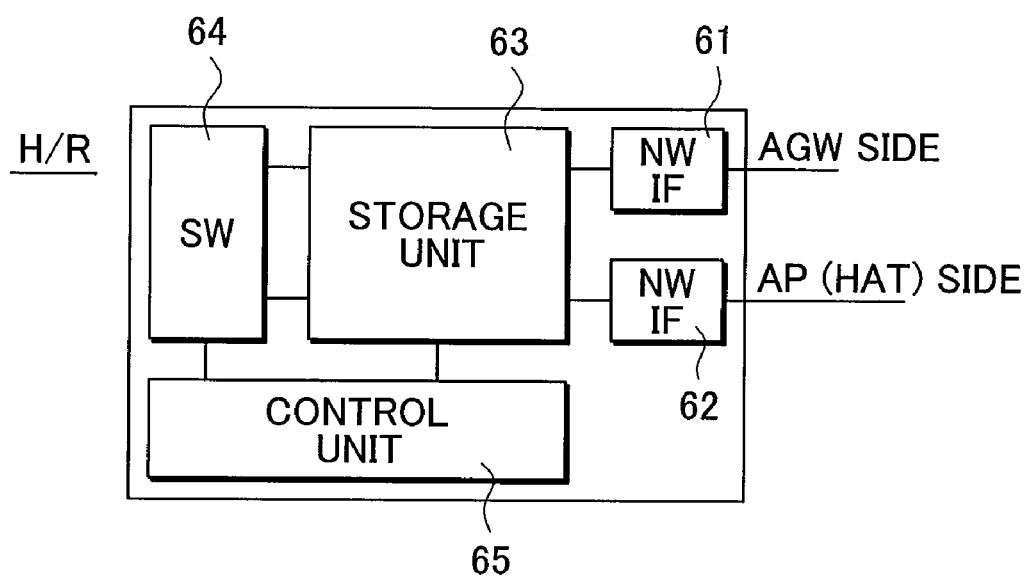
FIG. 4 is a diagram illustrating an example of the structure of a network system according to the first embodiment of the present invention.
Figure 5:
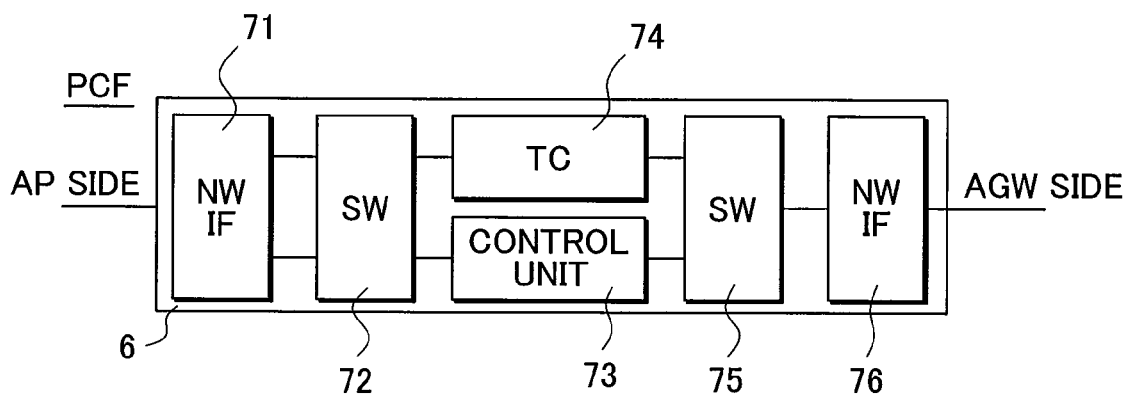
FIG. 5 is a diagram illustrating an example of the structure of a packet control device according to the first embodiment of the present invention.
Figure 6:
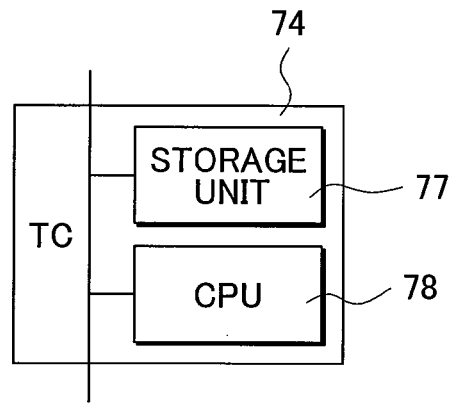
FIG. 6 is a diagram illustrating an example of the structure of a traffic control unit according to the first embodiment of the present invention.
Figure 7:
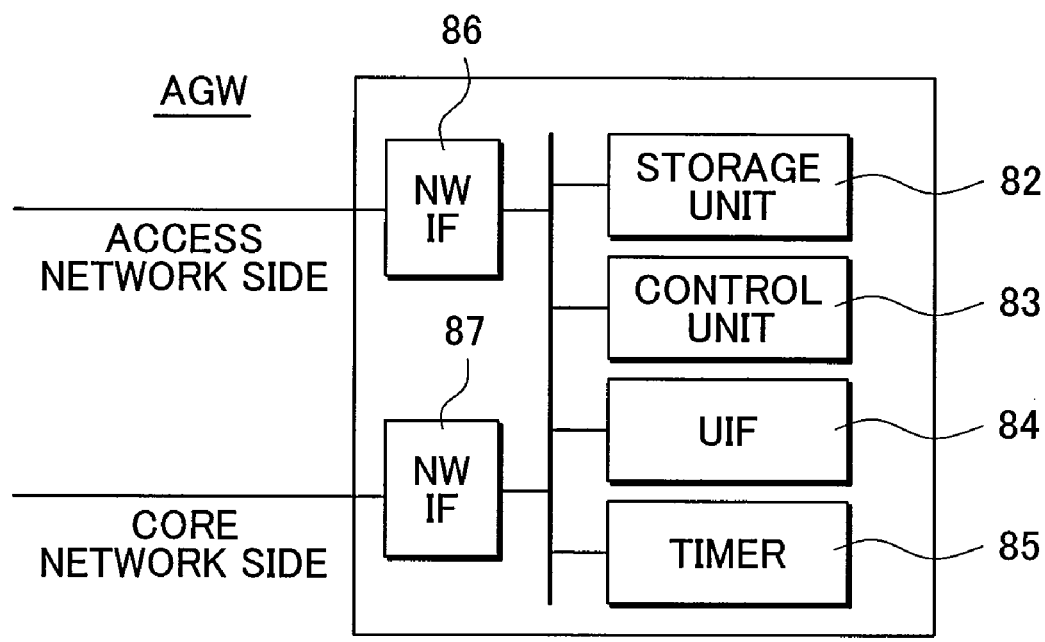
FIG. 7 is a diagram illustrating an example of the structure of an access gateway according to the first embodiment of the present invention.
Figure 8:
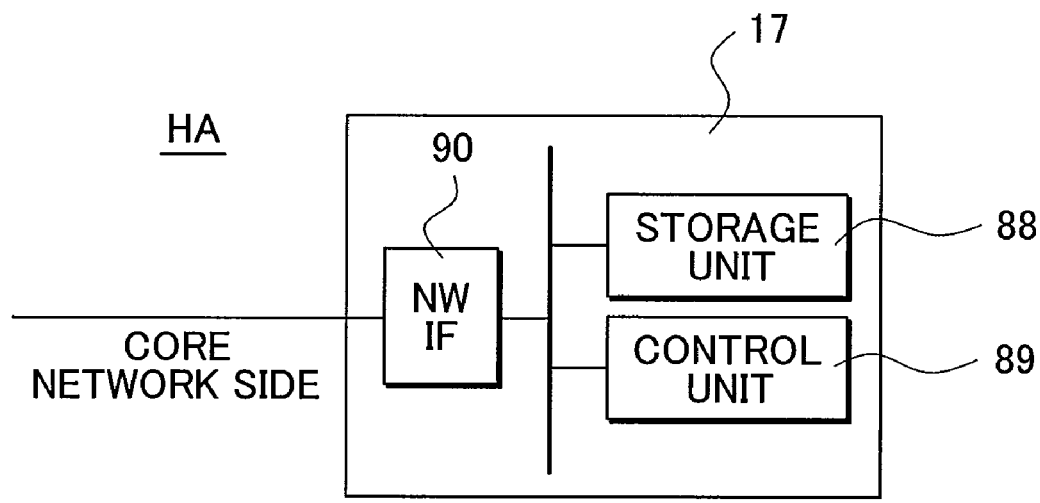
FIG. 8 is a diagram illustrating an example of the structure of a home agent according to the first embodiment of the present invention.
Figure 9:
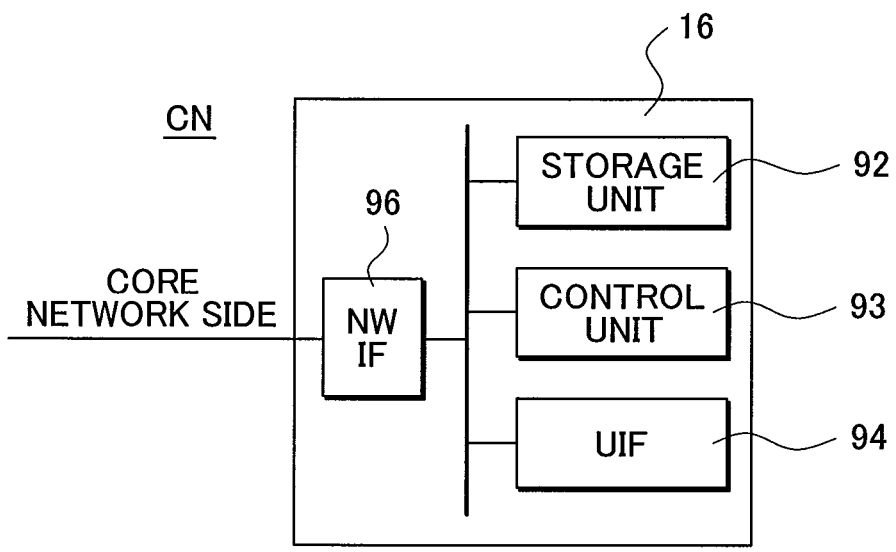
FIG. 9 is a diagram illustrating an example of the structure of a node apparatus according to the first embodiment of the present invention.
Figure 10:
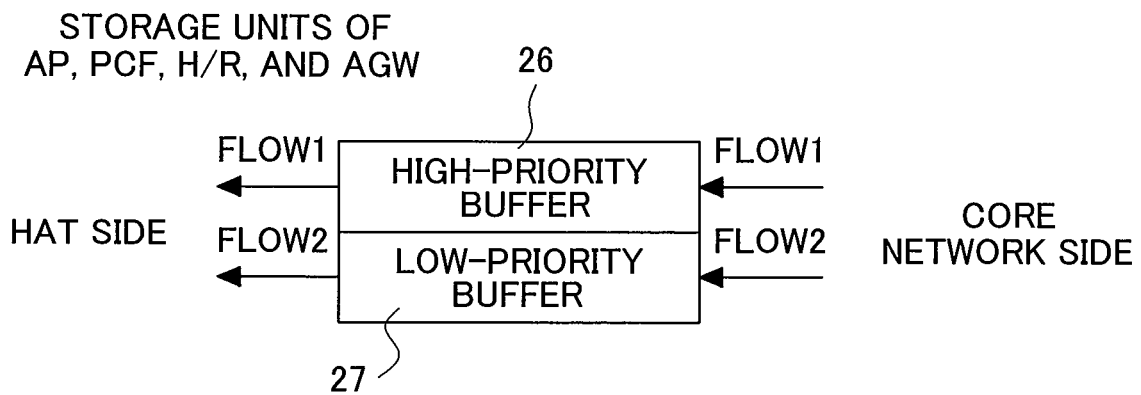
FIG. 10 is a diagram illustrating an example of a priority control method according to the first embodiment of the present invention.
Figure 11:
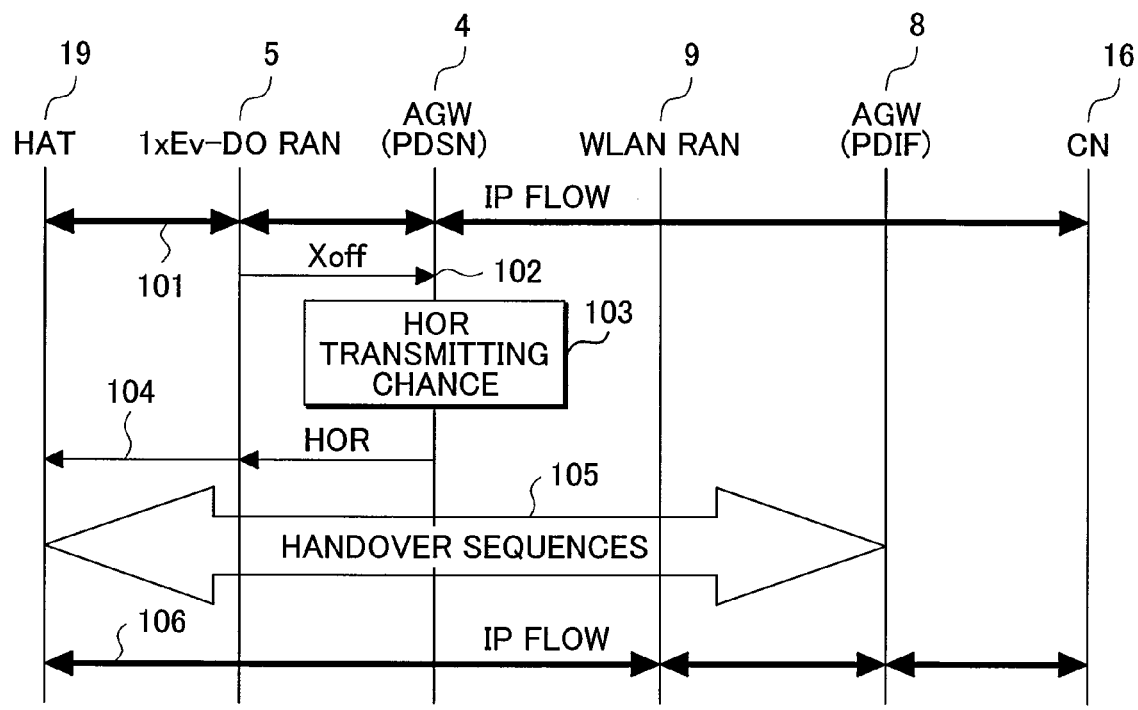
FIG. 11 is a diagram illustrating an example of a call flow of a handover between systems according to the first embodiment of the present invention.
Figure 12:
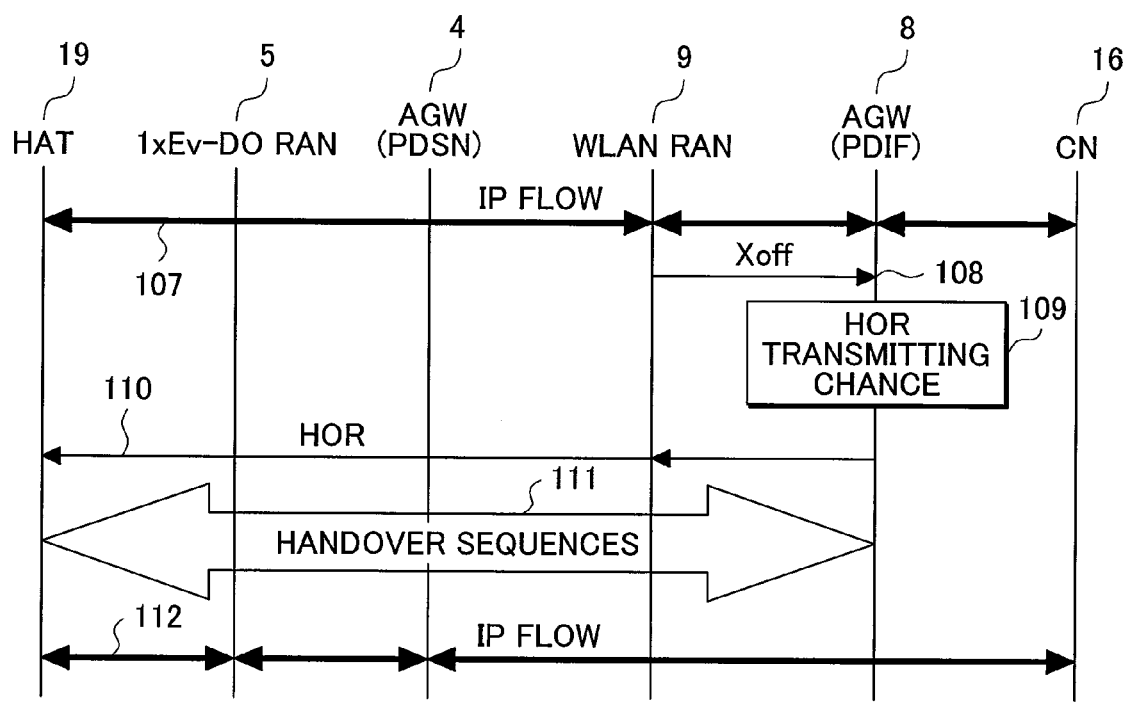
FIG. 12 is a diagram illustrating an example of a call flow of a handover between systems according to another embodiment of the present invention.
Figure 13:
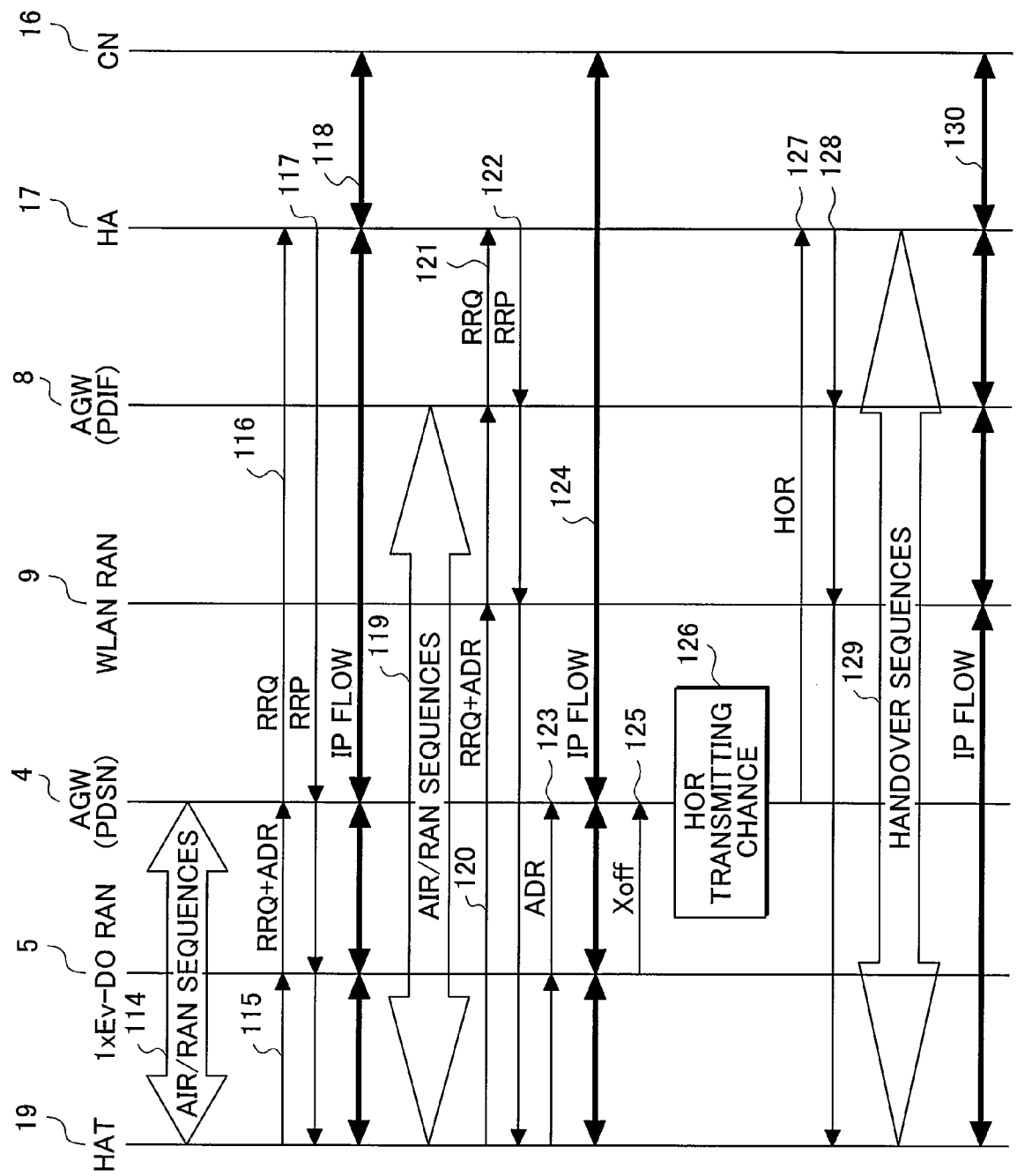
FIG. 13 is a diagram illustrating an example of a call flow of a handover between systems according to still another embodiment of the present invention.
Figure 14:
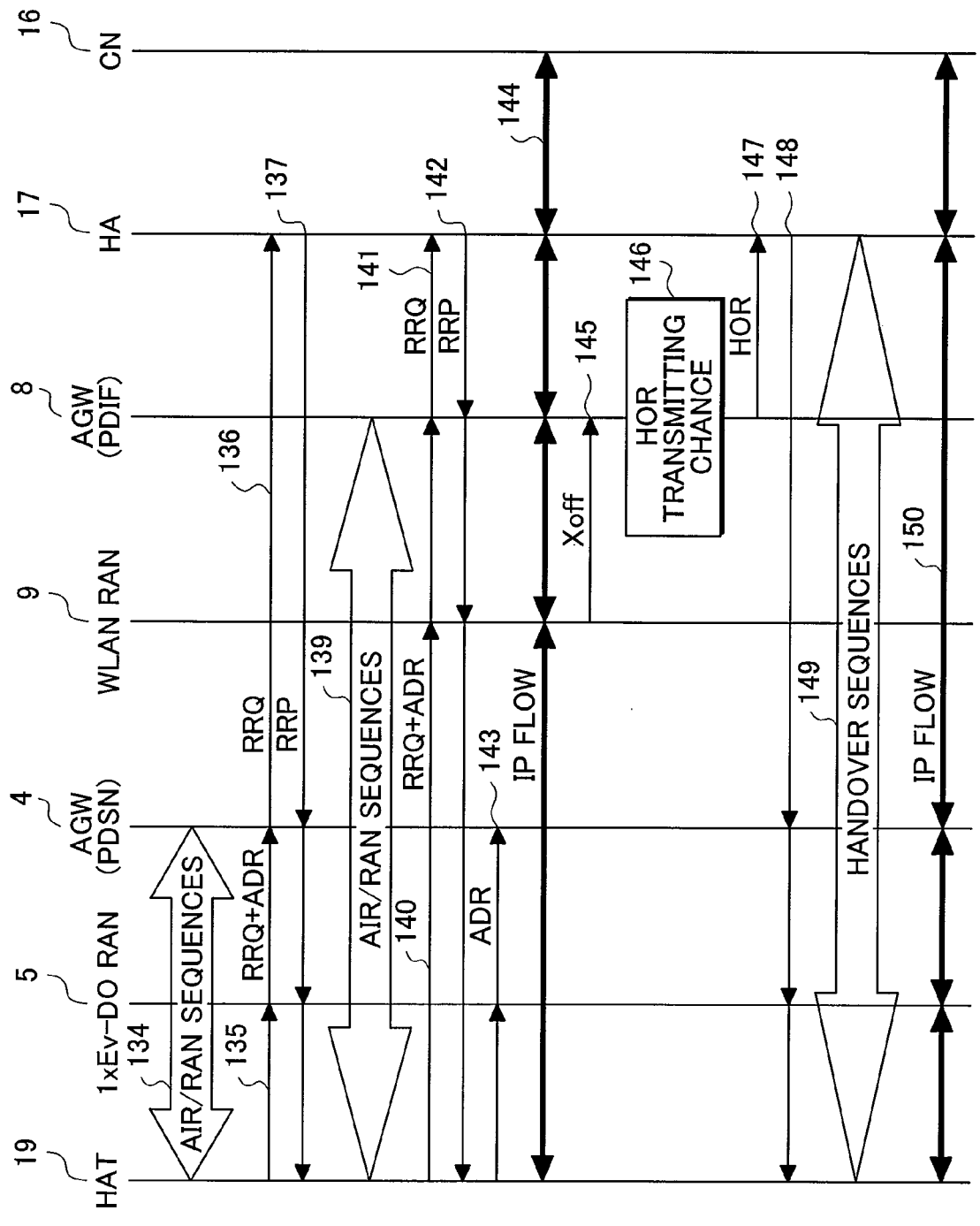
FIG. 14 is a diagram illustrating an example of a call flow of a handover between systems according to yet embodiment of the present invention.
Figure 17:
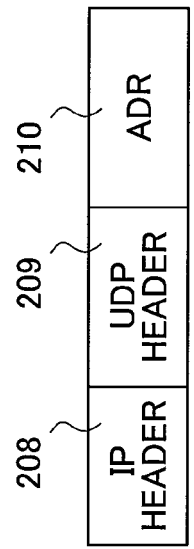
FIG. 17 is a diagram illustrating still another example of the packet format according to the present invention.
Figure 18:
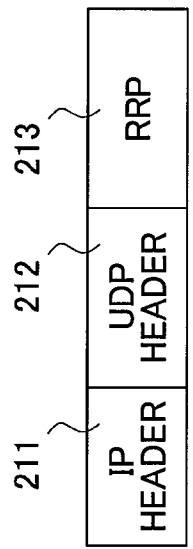
FIG. 18 is a diagram illustrating yet another example of the packet format according to the present invention.
Figure 19:
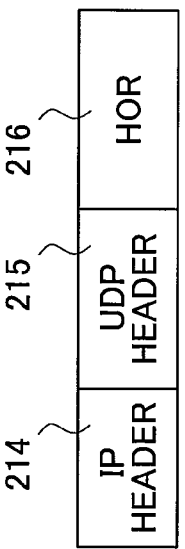
FIG. 19 is a diagram illustrating still yet another example of the packet format according to the present invention.
Figure 15:
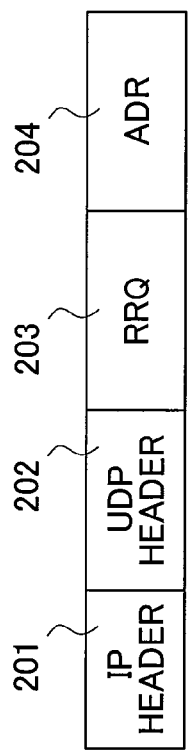
FIG. 15 is a diagram illustrating an example of a packet format according to the present invention.
Figure 16:
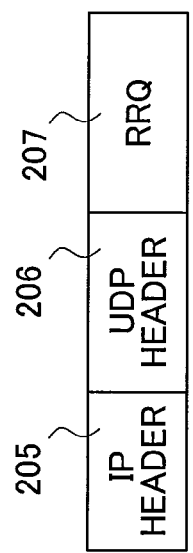
FIG. 16 is a diagram illustrating another example of the packet format according to the present invention.
Figures 20, 21, 22:
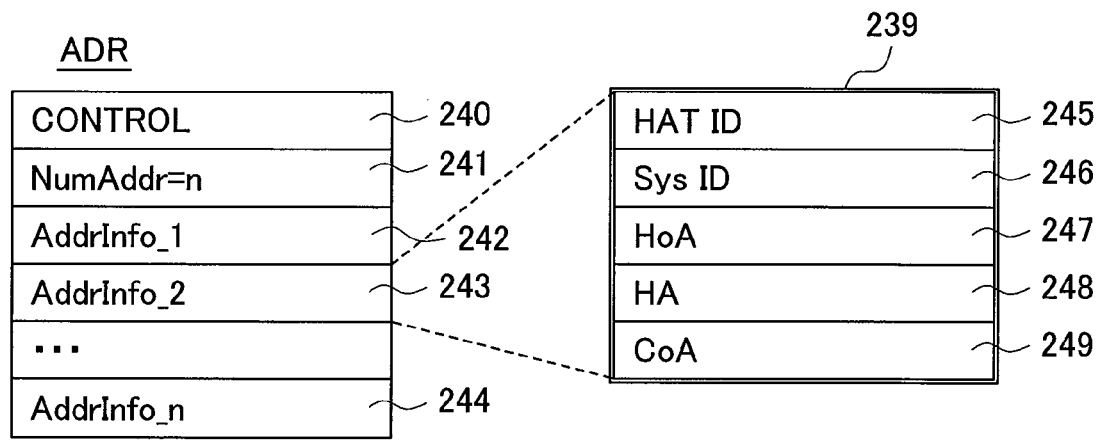
FIG. 20 is a diagram illustrating an example of an RRQ message format.
FIG. 21 is a diagram illustrating an example of an RRP message format.
FIG. 22 is a diagram illustrating an example of a message format according to the present invention.
Figure 25:
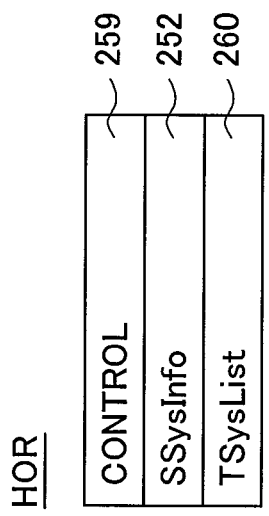
FIG. 25 is a diagram illustrating yet another example of the message format according to the present invention.
Figure 26:
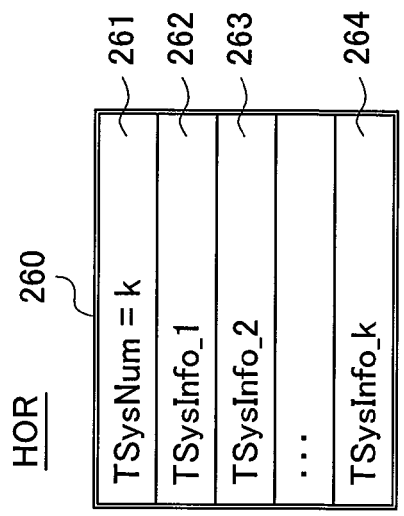
FIG. 26 is a diagram illustrating still yet another example of the message format according to the present invention.
Figure 23:
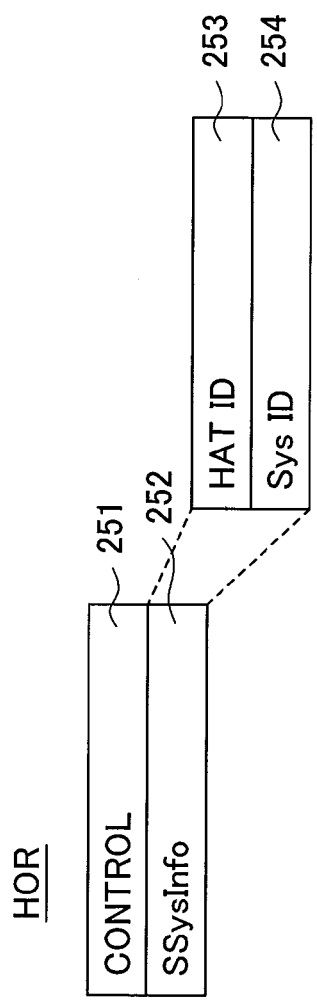
FIG. 23 is a diagram illustrating another example of the message format according to the present invention.
Figure 24:
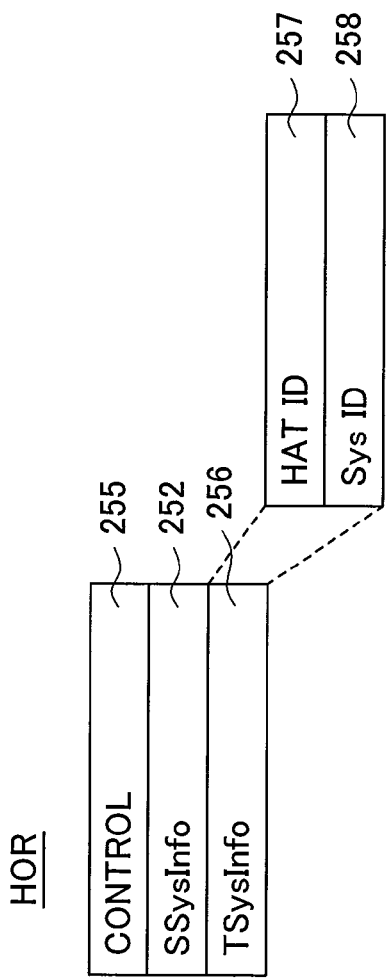
FIG. 24 is a diagram illustrating still another example of the message format according to the present invention.
Figure 34:
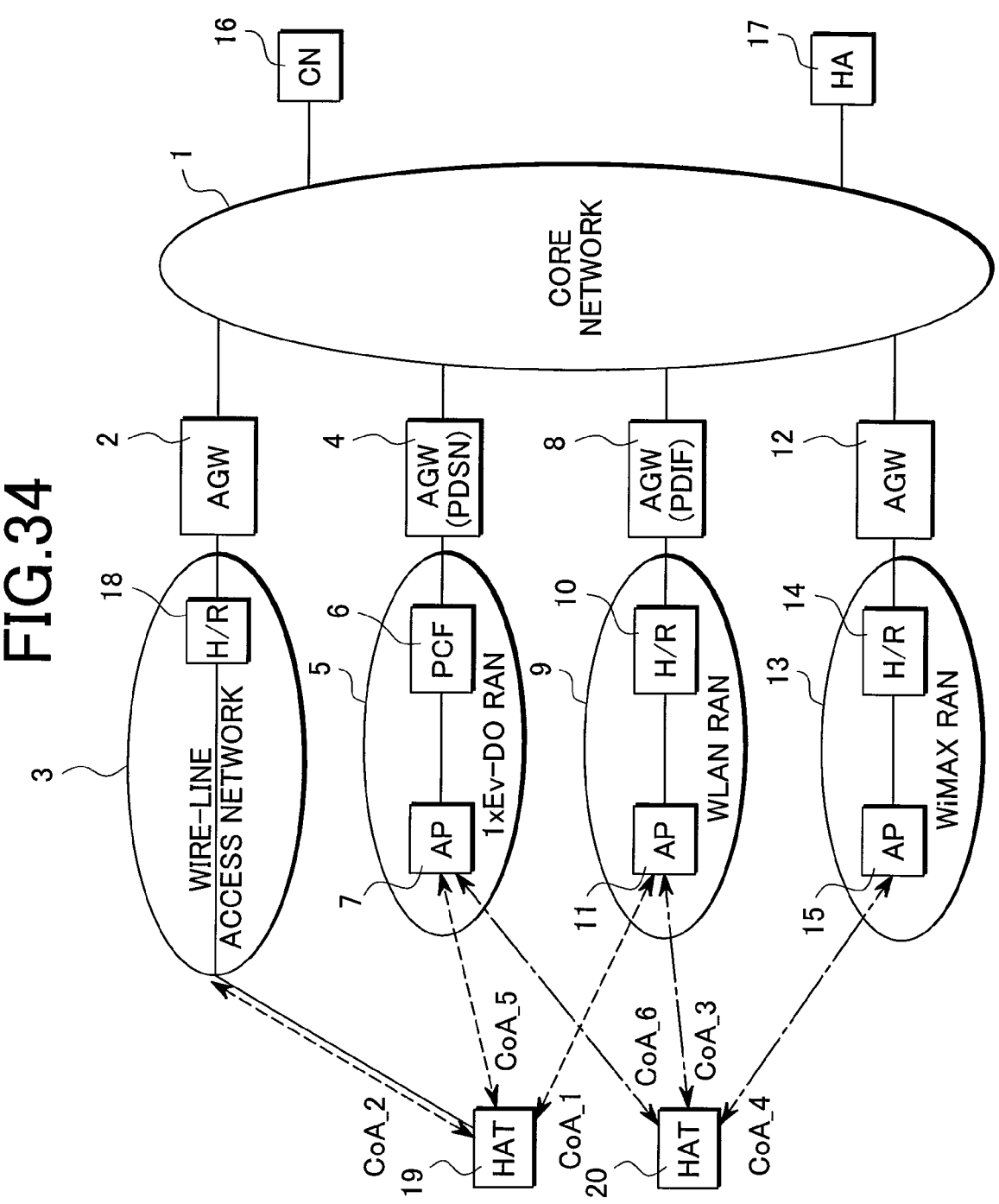
FIG. 34 is a diagram illustrating an example of the structure of a wireless system according to the first embodiment of the present invention.
Figure 37:
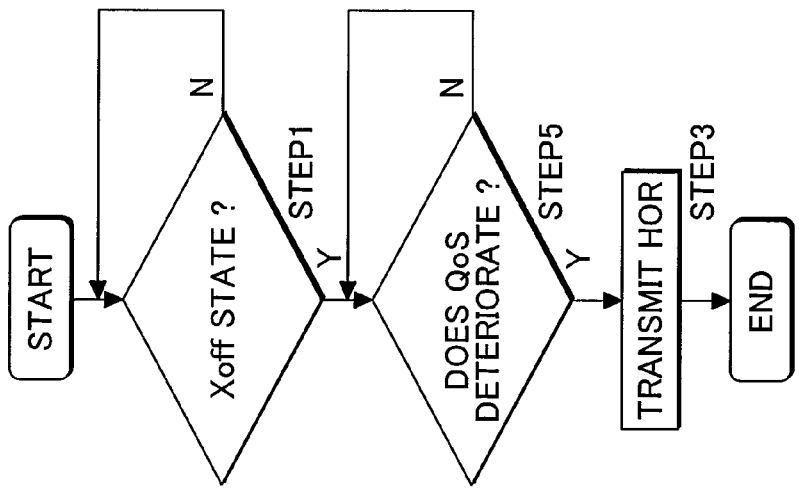
FIG. 37 is a flowchart illustrating an algorithm for determining a signal transmitting chance according to still another embodiment of the invention.
Figure 36:
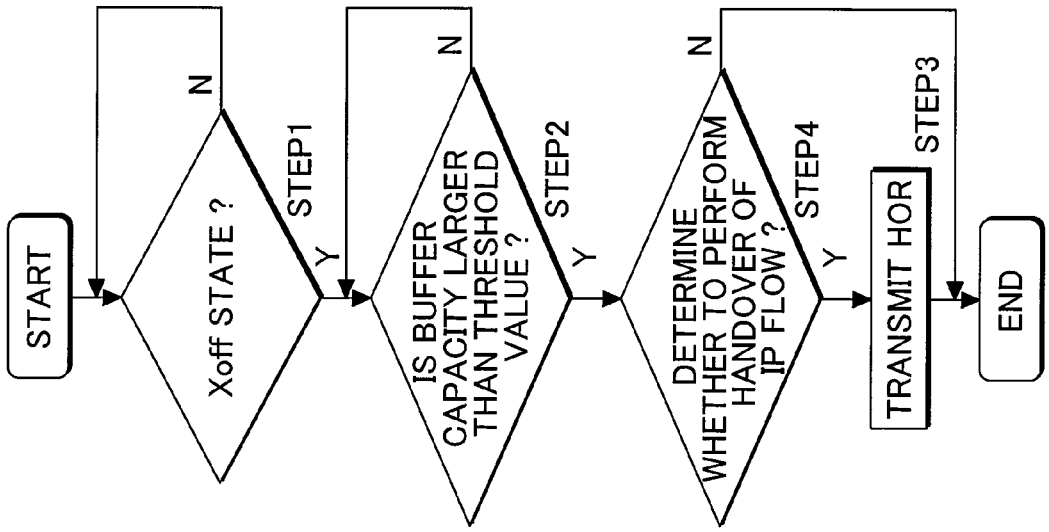
FIG. 36 is a flowchart illustrating an algorithm for determining a signal transmitting chance according to another embodiment of the present invention.
Figure 35:
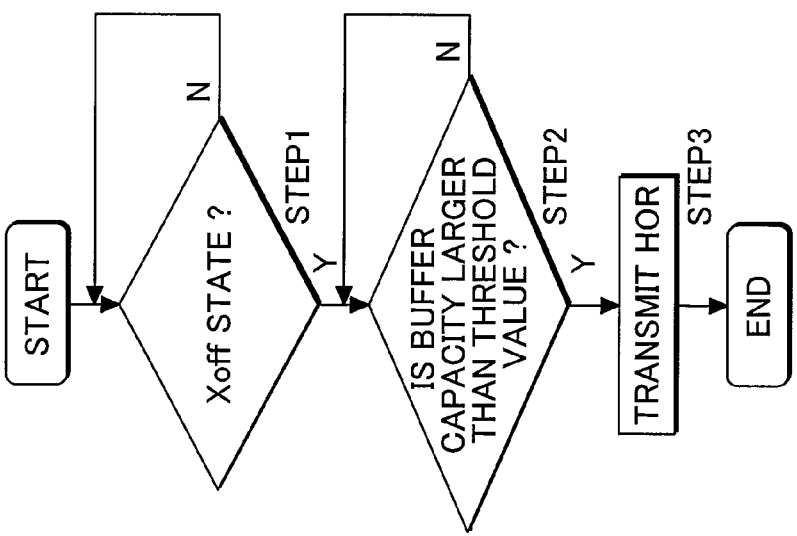
FIG. 35 is a flowchart illustrating an algorithm for determining a signal transmitting chance according to the first embodiment of the present invention.
Figure 40:
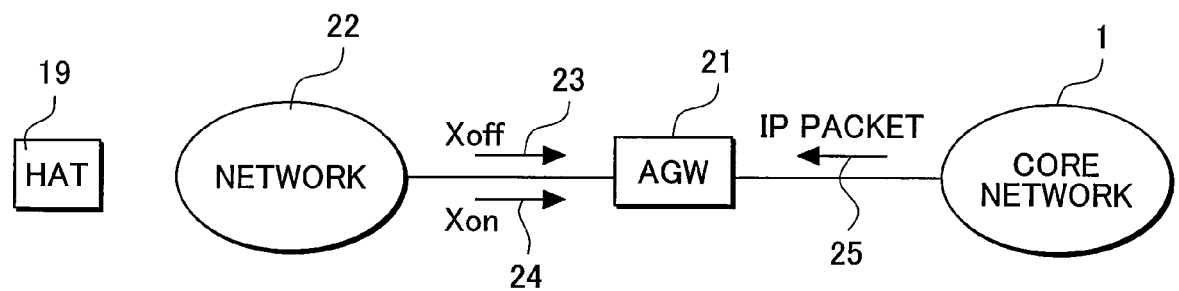
FIG. 40 is a diagram illustrating an example of a flow control method.

1 . . . ,2,4,8,12 . . . AGW, 6 . . . PCF, 10,14,18 . . . H/R, 7,11, 15 . . . AP, 19,20 . . . HAT, 16 . . . CN, 17 . . . HA, 23 . . . a packet transmission stop signal, 24 . . . a packet transmission start signal, 34 . . . a 1xEv-DO interface (1xEv-DO IF), 39 . . . WLAN IF, 44 . . . WiMAX IF, 49 . . . Wire-line IF, 103,109,126,146 . . . message transmitting chance.

What is claimed is:

1. An access gateway configured to belong to a first access network in a wireless system, wherein said wireless system includes the first access network, a second access network, and a terminal having interfaces corresponding to each of the first and second access networks, wherein flow in the first access network is controlled by the access gateway and flow in the second access network is controlled by a second access gateway, said access gateway comprising:
a unit for receiving a packet transmission stop signal output by the first access network; and
a control unit,
wherein, in response to the unit receiving the packet transmission stop signal output by the first access network, the control unit determines whether a predetermined message transmitting chance is to be given, and in response to determining that the message transmitting chance is to be given, the control unit transmits a message to the terminal that requests a handover to the second access network whose type is different from that of the first access network.

2. The access gateway according to claim 1, further comprising:
a unit for receiving a message including address information of an interface of the terminal; and
a storage unit for storing the address information,
wherein the control unit manages the address information, selects a destination from the address information, and transmits the message.

3. The access gateway according to claim 1, further comprising:
a storage unit for storing transmission information for the terminal,
wherein, when an amount of the transmission information stored in the storage unit is larger than a threshold value, it is determined that the message transmitting chance is to be given.

4. The access gateway according to claim 1, further comprising:
a storage unit for storing a communication quality to be provided to the terminal,
wherein the control unit measures the communication quality to be provided to the terminal and compares the measured communication quality with the communication quality stored in the storage unit, and
when the measured communication quality is lower than that stored in the storage unit, it is determined that the message transmitting chance is to be given.

5. The access gateway according to claim 4,
wherein the control unit measures and compares at least one of a packet loss rate and latency as the communication quality.

6. The access gateway according to claim 1,
wherein the predetermined message transmitting chance is randomly determined.

7. The access gateway according to claim 1, further comprising:
a storage unit for storing a communication quality provided to the terminal,
wherein, when the communication quality is within a predetermined range, it is determined that the predetermined message transmitting chance is to be given.

8. The access gateway according to claim 7,
wherein the communication quality is at least one of a traffic class, priority, latency, and a packet loss rate.

9. A flow control method in a wireless system including a first access network, a second access network, and a terminal having interfaces corresponding to each of the first and second access networks, wherein flow in the first access network is controlled by a first access gateway and flow in the second access network is controlled by a second access gateway, the method comprising:
allowing the terminal to communicate through the first access network including the first access gateway,
allowing the first access gateway to determine whether a predetermined message transmitting chance is to be given in response to the first access gateway receiving a packet transmission stop signal received from the first access network; and
transmitting a message to the terminal requesting a handover to the second access network including the second access gateway, in response to the first access gateway determining that the message transmitting chance is to be given.

10. The flow control method in the wireless system according to claim 9,
wherein the handover request message is transmitted to the terminal through the first access network including the first access gateway and a first interface of the terminal corresponding to the first access network including the first access gateway.

11. The flow control method in the wireless system according to claim 10,
wherein, in the first access gateway and the first access network including the first access gateway, the handover request message is sent with a priority higher than user data.

12. The flow control method in the wireless system according to claim 9,
wherein the handover request message is transmitted to the terminal through the second access network not including the first access gateway, and a second interface of the terminal corresponding to the second access network.

13. The flow control method in the wireless system according to claim 9,
wherein, in the determination of the predetermined message transmitting chance, when an amount of the information transmitted to the terminal is larger than a threshold value, it is determined that the message transmitting chance is to be given.

14. The flow control method in the wireless system according to claim 9, further comprising:
measuring a communication quality provided to the terminal;
comparing the measured communication quality with a communication quality to be provided to the terminal that has been stored in a storage unit beforehand; and
determining that the message transmitting chance is to be given, when the measured communication quality is lower than that stored in the storage unit, in the determination of the predetermined message transmitting chance.

15. The flow control method in the wireless system according to claim 9, further comprising steps of:
managing information of the communication quality granted by the first access network;
examining whether to perform a handover on a parameter of the communication quality; and
comparing the communication qualities when it is determined that the handover is performed on the parameter.

* * * * *